US009764569B2

(12) United States Patent
Kawai

(10) Patent No.: US 9,764,569 B2
(45) Date of Patent: Sep. 19, 2017

(54) PRINTER, AND METHOD AND COMPUTER-READABLE MEDIUM FOR THE SAME

(71) Applicant: Brother Kogyo Kabushiki Kaisha, Nagoya-shi, Aichi-ken (JP)

(72) Inventor: Junya Kawai, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/280,124

(22) Filed: Sep. 29, 2016

(65) Prior Publication Data

US 2017/0087897 A1 Mar. 30, 2017

(30) Foreign Application Priority Data

Sep. 30, 2015 (JP) ................................ 2015-194445

(51) Int. Cl.
*B41J 29/38* (2006.01)
*B41J 13/00* (2006.01)

(52) U.S. Cl.
CPC ................................ *B41J 13/0009* (2013.01)

(58) Field of Classification Search
CPC . B41J 13/0009; B41J 13/0018; B41J 13/0027
See application file for complete search history.

(56) References Cited

U.S. PATENT DOCUMENTS

2008/0179824 A1* 7/2008 Koyama ................ B41J 11/425 271/259
2012/0248689 A1* 10/2012 Hirano ................ B41J 13/0027 271/258.03

FOREIGN PATENT DOCUMENTS

JP 2007-038557 A 2/2007

* cited by examiner

*Primary Examiner* — Juanita D Jackson
(74) *Attorney, Agent, or Firm* — Banner & Witcoff, Ltd.

(57) ABSTRACT

A printer includes a controller configured to perform a through-up printing process to print at least a part of a page while accelerating a conveyance speed of a print medium from zero at a particular acceleration, a constant-speed printing process to print at least a part of the page while maintaining a maximum conveyance speed after the conveyance speed reaches the maximum conveyance speed via the through-up printing process, a through-down printing process to print at least a part of the page while decelerating the conveyance speed at a particular deceleration after performing at least one of the through-up printing process and the constant-speed printing process, and a maximum speed setting process to set the maximum conveyance speed in accordance with a print amount of print data stored in a storage.

11 Claims, 16 Drawing Sheets

100

| PRINT LENGTH | MAXIMUM CONVEYANCE SPEED |
|---|---|
| 4mm | 50mm/s |
| 5mm | 60mm/s |
| 7mm | 70mm/s |
| 10mm | 80mm/s |
| 14mm or longer | 90mm/s |

PRINTER, AND METHOD AND COMPUTER-READABLE MEDIUM FOR THE SAME

CROSS-REFERENCE TO RELATED APPLICATION

This application claims priority under 35 U.S.C. §119 from Japanese Patent Application No. 2015-194445 filed on Sep. 30, 2015. The entire subject matter of the application is incorporated herein by reference.

BACKGROUND

Technical Field

The following description relates to aspects of a printer, a method, and a non-transitory computer-readable storage medium for printing images on a long print medium while conveying the print medium.

Related Art

A printer has been known that is configured to print images on a long print medium while conveying the print medium. In the known printer, if print data of a next sheet is in a printable state at a point of time when printing of a current sheet is completed, printing of the next sheet is continuously performed. Meanwhile, if the print data of the next sheet is not in the printable state at the point of time when printing of the current sheet is completed, a trailing end of the current sheet is conveyed to a cut position, and the current sheet is cut off. Thereafter, a leading end of a continuous print medium is conveyed to a print start position.

SUMMARY

The known printer is configured to perform a continuous printing operation to continuously print a plurality of pages while sequentially receiving print data of the plurality of pages in a state where a conveyance speed of the print medium is maintained. In such a printer, when receiving of the print data of the plurality of pages is halted, the continuous printing operation is stopped. In this case, a motor for conveying the print medium is controlled to be decelerated and stopped at the same time as when printing of an intended page is completed. It is noted that the intended page is a page based on print data last received.

The shorter a length in a conveyance direction of each page of the plurality of pages is, the shorter a period of time required until printing of the intended page is completed after control for stopping the continuous printing operation is started is. As the period of time required until printing of the intended page is completed is shorter, the motor, which is decelerated in the control for stopping the continuous printing operation, is more likely to stop later than the completion of printing of the intended page. When the motor stops later than the completion of printing of the intended page, the print medium is conveyed downstream in the conveyance direction after the completion of printing of the intended page. Therefore, there is a risk that an unnecessary blank might be formed on the print medium. Further, when the period of time required until printing of the intended page is completed is short, there is a risk that the motor might break down due to a large load for decelerating the motor in a short time.

Aspects of the present disclosure are advantageous to provide one or more improved techniques, for a printer, which make it possible to achieve a continuous printing operation for a plurality of pages even when a length in a conveyance direction of each page of the plurality of pages is short.

According to aspects of the present disclosure, a printer is provided, which includes a conveyor configured to convey a print medium along a conveyance path in a conveyance direction, a storage configured to receive and store print data of a page as a single unit, a print head configured to print the page on the print medium based on the print data stored in the storage, on the conveyance path, and a controller configured to perform a through-up printing process to control the print head to print at least a part of the page while controlling the conveyor to accelerate a conveyance speed of the print medium from zero at a particular acceleration, a constant-speed printing process to control the print head to print at least a part of the page while controlling the conveyor to maintain a maximum conveyance speed after the conveyance speed reaches the maximum conveyance speed via the through-up printing process, a through-down printing process to control the print head to print at least a part of the page while controlling the conveyor to decelerate the conveyance speed at a particular deceleration after performing at least one of the through-up printing process and the constant-speed printing process, and a maximum speed setting process to set the maximum conveyance speed in accordance with a print amount of the print data stored in the storage.

According to aspects of the present disclosure, further provided is a method adapted to be implemented on a processor coupled with a printer including a conveyor configured to convey a print medium along a conveyance path in a conveyance direction, a storage configured to receive and store print data of a page as a single unit, and a print head configured to print the page on the print medium based on the print data stored in the storage, on the conveyance path, the method including a through-up printing process to control the print head to print at least a part of the page while controlling the conveyor to accelerate a conveyance speed of the print medium from zero at a particular acceleration, a constant-speed printing process to control the print head to print at least a part of the page while controlling the conveyor to maintain a maximum conveyance speed after the conveyance speed reaches the maximum conveyance speed via the through-up printing process, a through-down printing process to control the print head to print at least a part of the page while controlling the conveyor to decelerate the conveyance speed at a particular deceleration after performing at least one of the through-up printing process and the constant-speed printing process, and a maximum speed setting process to set the maximum conveyance speed in accordance with a print amount of the print data stored in the storage.

According to aspects of the present disclosure, further provided is a non-transitory computer-readable medium storing computer-readable instructions that are executable by a processor coupled with a printer including a conveyor configured to convey a print medium along a conveyance path in a conveyance direction, a storage configured to receive and store print data of a page as a single unit, and a print head configured to print the page on the print medium based on the print data stored in the storage, on the conveyance path, the instructions being configured to, when executed by the processor, cause the processor to perform a through-up printing process to control the print head to print at least a part of the page while controlling the conveyor to accelerate a conveyance speed of the print medium from zero at a particular acceleration, a constant-speed printing process to control the print head to print at least a part of the page while controlling the conveyor to maintain a maximum conveyance speed after the conveyance speed reaches the maximum conveyance speed via the through-up printing process, a through-down printing process to control the print head to print at least a part of the page while controlling the conveyor to decelerate the conveyance speed at a particular deceleration after performing at least one of the through-up printing process and the constant-speed printing process, and a maximum speed setting process to set the maximum conveyance speed in accordance with a print amount of the print data stored in the storage.

BRIEF DESCRIPTION OF THE ACCOMPANYING DRAWINGS

Figures 11, 12:
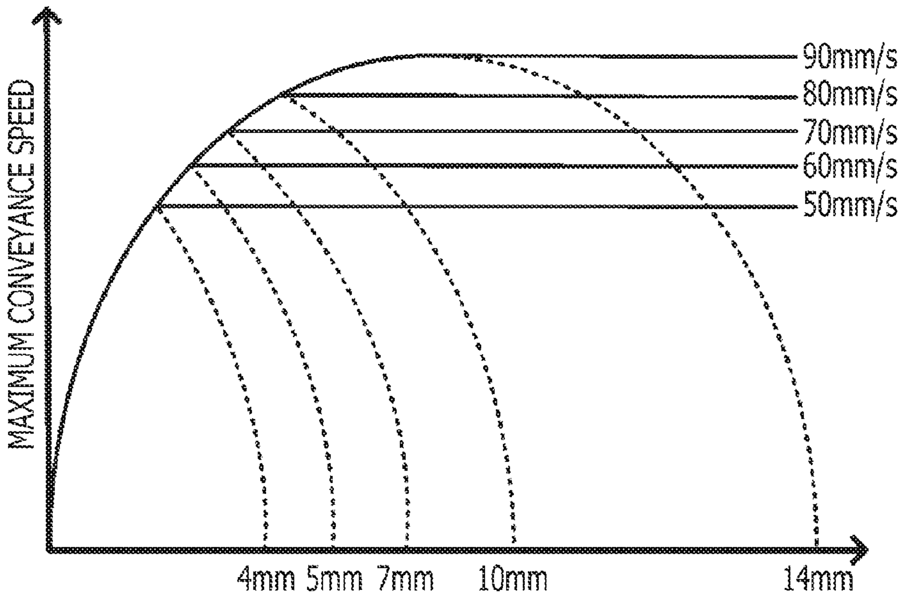

FIG. 11 exemplifies a speed setting table stored in the printer in the illustrative embodiment according to one or more aspects of the present disclosure.

FIG. 12 is a graph showing a relationship between a print length and a maximum conveyance speed in the illustrative embodiment according to one or more aspects of the present disclosure.

Figure 13:
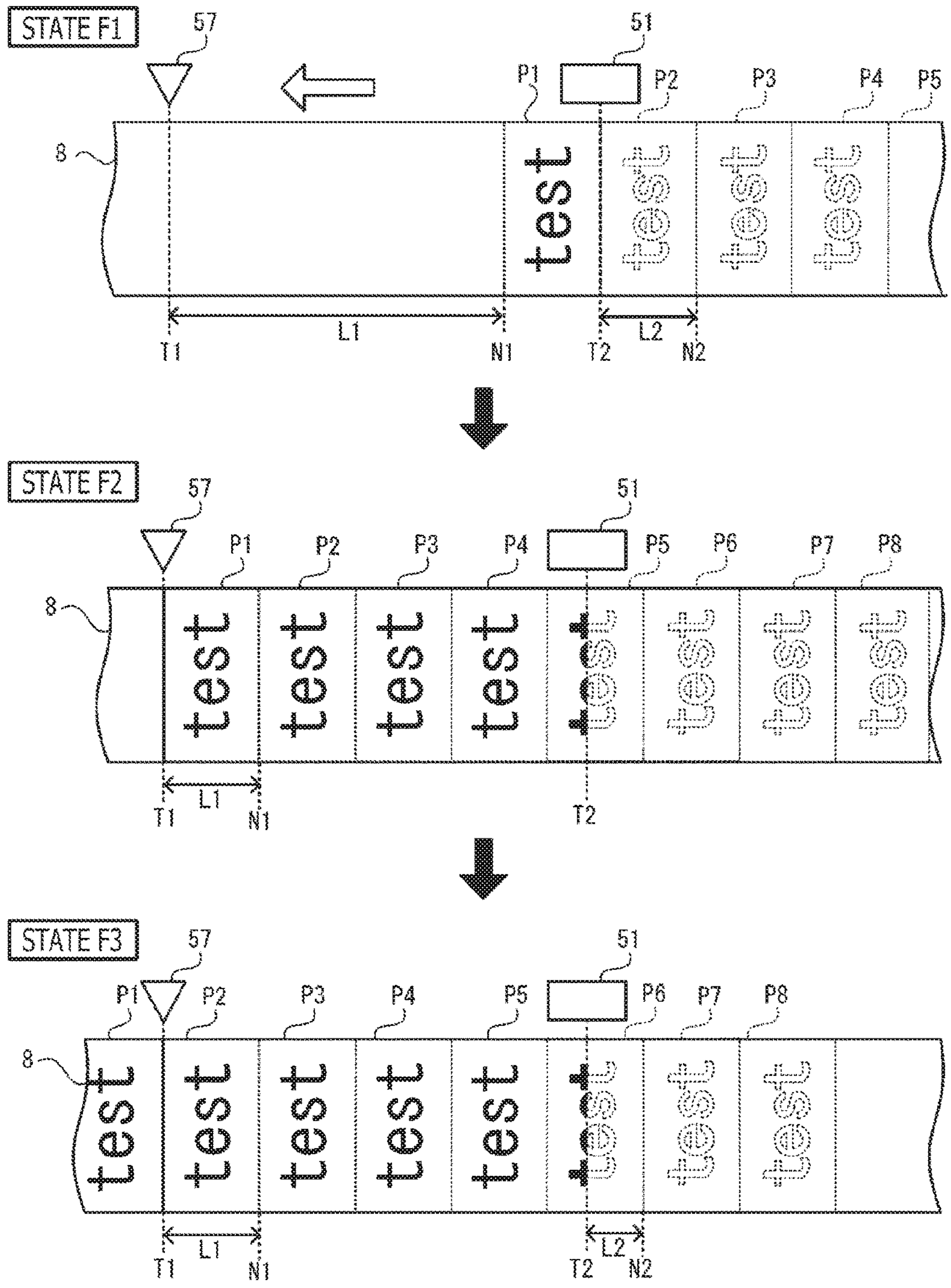
Figure 14:
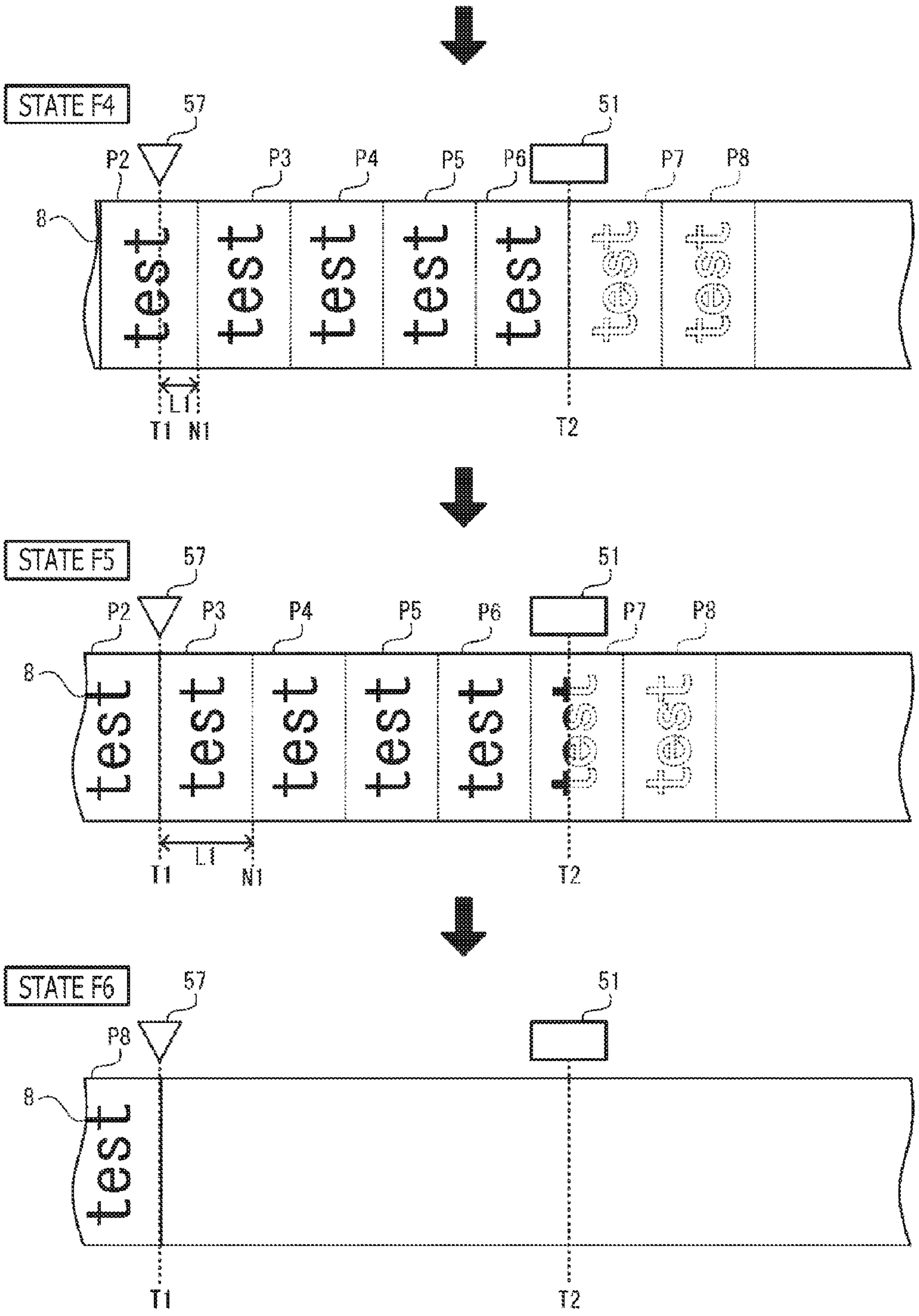

FIGS. 13 and 14 are illustrations showing a flow of a printing operation for the tape in the illustrative embodiment according to one or more aspects of the present disclosure.

Each of FIGS. 15 to 20 exemplifies a relationship between a conveyance time and a conveyance speed of the tape in a printing operation based on the main process in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
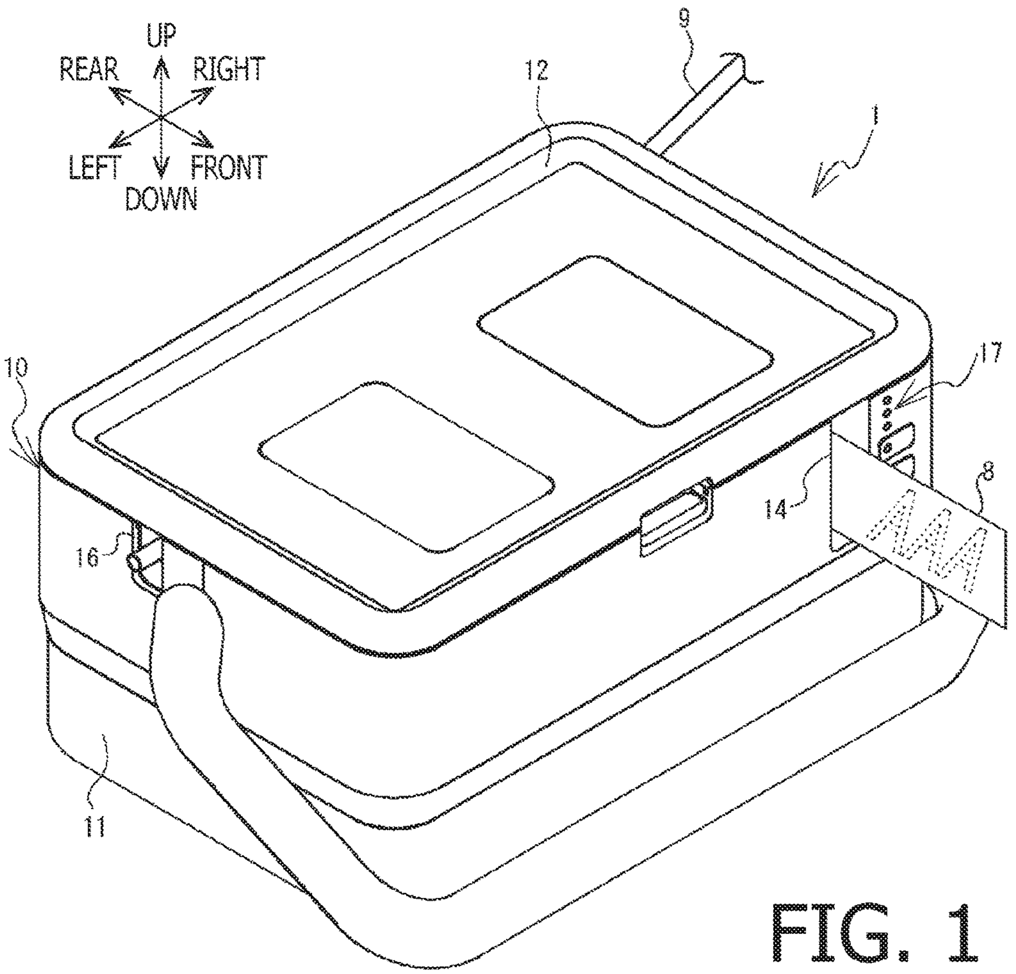
FIG. 1 is a perspective view showing a printer when viewed from an upper front left side, in an illustrative embodiment according to one or more aspects of the present disclosure.
Figure 2:
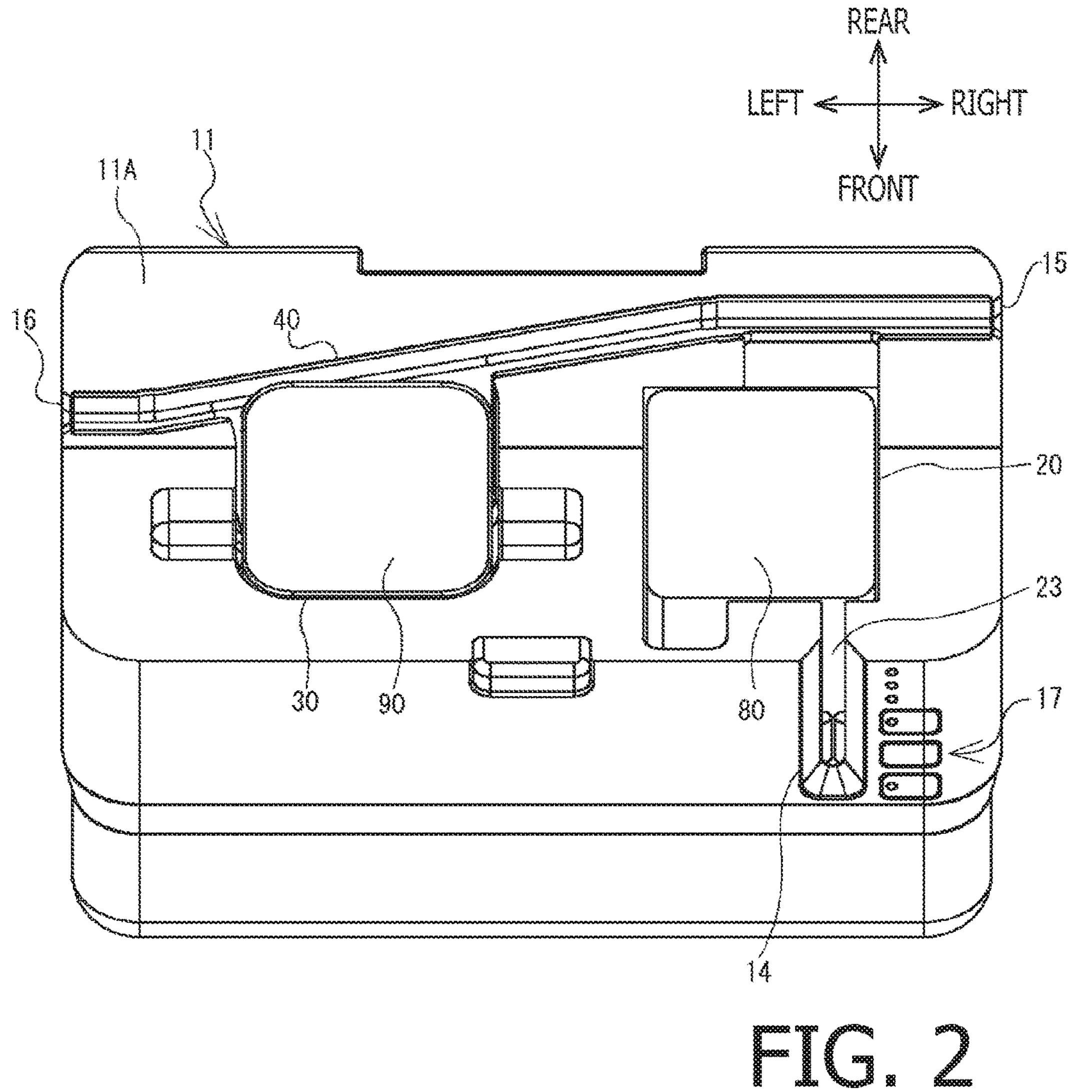
FIG. 2 is a perspective view showing a main body casing of the printer when viewed from an upper front side, in the illustrative embodiment according to one or more aspects of the present disclosure.
Figure 3:
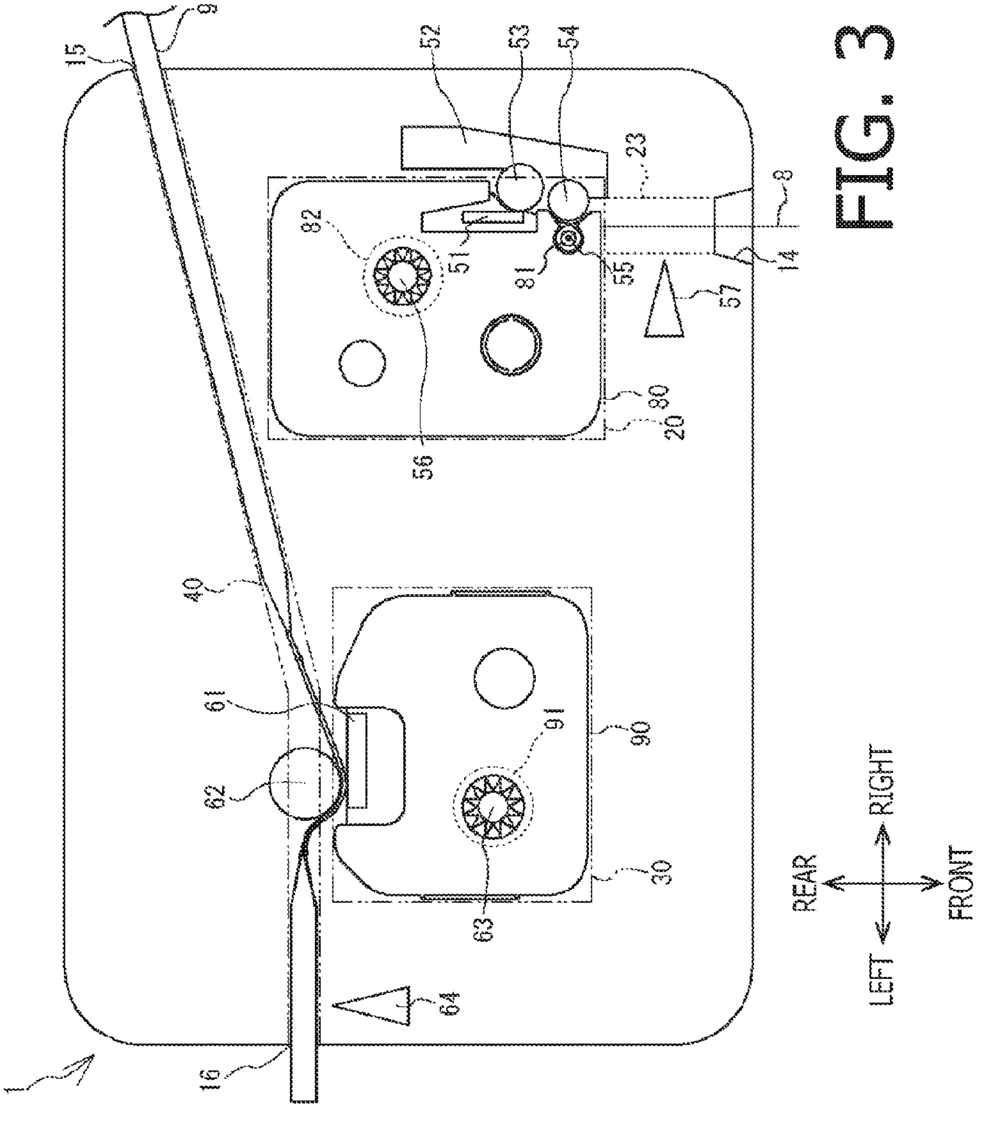
FIG. 3 is a plain view schematically showing an internal configuration of the printer in the illustrative embodiment according to one or more aspects of the present disclosure.

Hereinafter, an illustrative embodiment according to aspects of the present disclosure will be described with reference to the accompanying drawings. In the following description, an upside, a downside, a left side, a right side, a front side, and a rear side of a printer 1 of the illustrative embodiment will be defined as shown in FIG. 1. FIG. 2 schematically shows a tape cassette 80 and a ribbon cassette 90. FIG. 3 schematically shows a state where the tape cassette 80, the ribbon cassette 90, and a tube 9 are attached to a tape attachment section 20, a ribbon attachment section 30, and a tube attachment section 40, respectively.

As shown in FIG. 1, the printer 1 includes two printing mechanisms, and is configured to perform printing on a tape 8 and the tube 9 with the two printing mechanisms, respectively. The tape 8 is a strip-shaped print medium. The tube 9 is a tubular print medium. The printer 1 includes a housing 10. The housing 10 includes a main body casing 11 and a cover 12. The main body casing 11 is formed in the shape of a rectangular parallelepiped box having a longitudinal direction along a left-to-right direction. The cover 12 is a plate-shaped member disposed above the main body casing 11. A rear end portion of the cover 12 is rotatably supported by an upper rear end portion of the main body casing 11. When the cover 12 is closed relative to the main body casing 11 (see FIG. 1), the cover 12 covers an attachment surface 11A (see FIG. 2). When the cover 12 is open relative to the main body casing 11, the attachment surface 11A is exposed upward (see FIG. 2).

At side surfaces of the housing 10, a tape outlet 14, a tube inlet 15, a tube outlet 16, and a user interface 17 are disposed. The tape outlet 14 is disposed at a front surface of the housing 10. The tape outlet 14 is an opening for discharging the tape 8 out of the housing 10 therethrough. The tube inlet 15 is disposed at a right surface of the housing 10. The tube inlet 15 is an opening for introducing the tube 9 into the housing 10 therethrough. The tube outlet 16 is disposed at a left surface of the housing 10. The tube outlet 16 is an opening for discharging the tube 9 out of the housing 10 therethrough. The user interface 17 includes a display and operable members. The display includes a plurality of LEDs configured to show an operating condition of the printer 1. The operable members include a plurality of operable buttons that include a power button and a start button.

As shown in FIG. 2, at the attachment surface 11A, the tape attachment section 20, the ribbon attachment section 30, and the tube attachment section 40 are disposed. The tape attachment section 20 is a recessed section having an open upper side. The tape attachment section 20 is configured such that the tape cassette 80 is detachably attached thereto. In the illustrative embodiment, the tape attachment section 20 is positioned at a right portion of the attachment surface 11A. When the cover 12 is open (see FIG. 1), a user is allowed to detachably attach the tape cassette 80 to the tape attachment section 20 from above. A conveyance guide 23 is a groove that continuously extends frontward from a front right portion of the tape attachment section 20. A front end portion of the conveyance guide 23 is connected with the tape outlet 14.

The ribbon attachment section 30 is a recessed section having an open upper side. The ribbon attachment section 30 is configured such that the ribbon cassette 90 is detachably attached thereto. In the illustrative embodiment, the ribbon attachment section 30 is positioned at a left portion of the attachment surface 11A. When the cover 12 is open, the user is allowed to detachably attach the ribbon cassette 90 to the ribbon attachment section 30 from above. The tube attachment section 40 is configured such that the tube 9 (see FIG. 2) is detachably attached thereto.

The tube attachment section 40 is an upward-open groove extending from the tube inlet 15 to the tube outlet 16. In the illustrative embodiment, the tube attachment section 40 passes behind the tape attachment section 20 and the ribbon attachment section 30. Further, the tube attachment section 40 communicates with a rear end portion of the ribbon attachment section 30. When the cover 12 is open, the user is allowed to detachably attach the tube 9 to the tube attachment section 40 from above. The tube 9 is attached to the tube attachment section 40, so as to extend from the tube inlet 15 to the tube outlet 16.

As shown in FIG. 3, the tape cassette 80 is formed in a box shape and configured to accommodate the unused tape 8, an unused ink ribbon (not shown), a tape driving roller 81, and a ribbon winding spool 82. The tape driving roller 81 is configured to pull the tape 8 out of the tape cassette 80. The ribbon winding spool 82 is configured to wind the ink ribbon in the tape cassette 80.

The tape attachment section 20 is provided with a print head 51, a platen holder 52, and a tape driving shaft 55. The tape driving shaft 55 is configured to rotate the tape driving roller 81. A ribbon winding shaft 56 is configured to rotate the ribbon winding spool 82. The print head 51 is a thermal head configured to perform line-by-line printing using a plurality of printing elements arranged in a direction perpendicular to a conveyance direction of the tape 8. The print head 51 is disposed at a front right portion of the tape attachment section 20. On the right of the tape attachment section 20, the platen holder 52 is disposed. The platen holder 52 is configured to rotatably support a platen roller 53 and a movable conveyance roller 54. The platen roller 53 is opposed to the print head 51 and rotatable relative to the print head 51. The movable conveyance roller 54 is opposed to the tape driving shaft 55 and rotatable relative to the tape driving shaft 55.

When the cover 12 (see FIG. 1) is opened, the platen holder 52 moves to a retreat position such that the platen roller 53 and the movable conveyance roller 54 are placed outside the tape attachment section 20. When the user attaches the tape cassette 80 to the tape attachment section 20, the tape driving shaft 55 and the ribbon winding shaft 56 are inserted into the tape driving roller 81 and the ribbon winding spool 82, respectively.

Subsequently, when the cover 12 is closed, the platen holder 52 moves to an operating position such that the platen roller 53 and the movable conveyance roller 54 are placed inside the tape attachment section 20. At this time, the platen roller 53 urges, toward the print head 51, the tape 8 and the ink ribbon of the tape cassette 80 in an overlapped manner. The movable conveyance roller 54 pinches the tape 8 and the ink ribbon of the tape cassette 80 with the tape driving roller 81. Thereby, the printer 1 is placed in a printable state where the printer 1 is allowed to perform printing on the tape 8 of the tape cassette 80.

Behind the tape outlet 14 (i.e., on a rear side relative to the tape outlet 14), a cutter 57 is disposed. The cutter 57 is configured to cut the tape 8 laid in the conveyance guide 23 in a thickness direction of the tape 8. More specifically, the cutter 57 is capable of half cutting to cut a part (e.g., only a release paper) of layers of the tape 8 thereby forming a slit and is capable of full cutting to cut off all (e.g., the release paper and a mount) of the layers of the tape 8.

The ribbon cassette 90 is formed in a box shape and configured to accommodate an unused ink ribbon and a ribbon winding spool 91. The ribbon attachment section 30 includes a print head 61, a movable conveyance roller 62, and a ribbon winding shaft 63. The print head 61 is a thermal head configured to perform line-by-line printing by a plurality of printing elements arranged in a direction perpendicular to a conveyance direction of the tube 9. The print head 61 is disposed at a rear portion of the ribbon attachment section 30. The movable conveyance roller 62 is opposed to the print head 61 and rotatable relative to the print head 61. The ribbon winding shaft 63 is configured to rotate the ribbon winding spool 91.

When the cover 12 (see FIG. 1) is opened, the movable conveyance roller 62 is placed behind the tube attachment section 40 and separated away from the print head 61. When the user attaches the ribbon cassette 90 to the ribbon attachment section 30, the ribbon winding shaft 63 is inserted into the ribbon winding spool 91. The user attaches the tube 9 to the tube attachment section 40. Subsequently, when the cover 12 is closed, the movable conveyance roller 62 is placed inside the tube attachment section 40 and positioned close to the print head 61. At this time, the movable conveyance roller 62 urges, toward the print head 61, the tube 9 attached to the tube attachment section 40 and the ink ribbon of the ribbon cassette 90 in an overlapped manner. Thereby, the printer 1 is placed into a state where the printer 1 is allowed to perform printing on the tube 9 with the ribbon cassette 90.

On the right of the tube outlet 16, a cutter 64 is disposed. The cutter 64 is configured to cut the tube 9 attached to the tube attachment section 40 in a radial direction of the tube 9. The cutter 64 is capable of half cutting to cut a part of the tube 9 in the radial direction thereby forming a slit, and is capable of full cutting to cut off all of the tube 9 in the radial direction.

Figure 4:
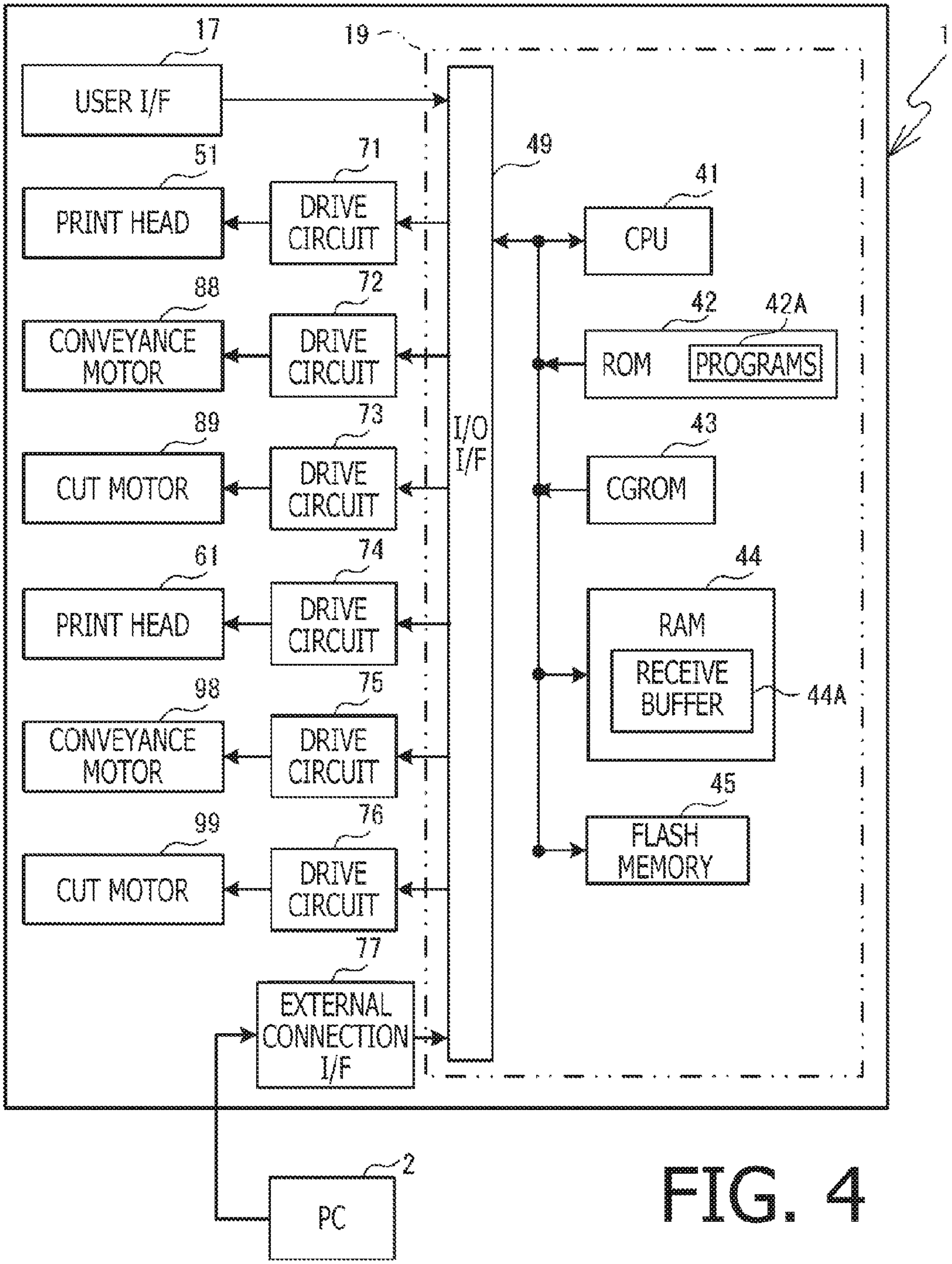
FIG. 4 is a block diagram showing an electrical configuration of the printer in the illustrative embodiment according to one or more aspects of the present disclosure.

Referring to FIG. 4, an electrical configuration of the printer 1 will be described. The printer 1 includes a control board 19. The control board 19 includes a CPU 41, a ROM 42, a CGROM 43, a RAM 44, a flash memory 45, and an input/output interface (hereinafter, which may be referred to as an I/O I/F) 49 interconnected via a data bus. The ROM 42 stores programs 42A to be executed by the CPU 41 to take control of the printer 1. The CGROM 43 stores print dot pattern data for printing characters. The characters include at least one of letters, letter strings, numerals, symbols, figures, and illustrations. The RAM 44 is configured to temporarily store data. The RAM 44 includes a receive buffer 44A configured to temporarily store print data received from an external device. The flash memory 45 is configured to store characters acquired from an external device, and a below-mentioned speed setting table 100 (see FIG. 11).

The I/O I/F 49 is connected with an operation interface 17, drive circuits 71, 72, 73, 74, 75, and 76, and an external connection I/F 77. The drive circuit 71 includes an electronic circuit configured to drive the print head 51. The drive circuit 72 includes an electronic circuit configured to drive a conveyance motor 88 for rotating the tape driving shaft 55 and the ribbon winding shaft 56. The drive circuit 73 includes an electronic circuit configured to drive the cut motor 89 for operating the cutter 57. The drive circuit 74 includes an electronic circuit configured to drive the print head 61. The drive circuit 75 includes an electronic circuit configured to drive a conveyance motor 98 for rotating the movable conveyance roller 62 and the ribbon winding shaft 63. The drive circuit 76 includes an electronic circuit configured to drive a cut motor 99 for operating the cutter 64.

The external connection I/F 77 is an interface for connecting an external device with the printer 1. In the illustrative embodiment, a PC 2, as an external device, is connected with the printer 1 via the external connection I/F 77. In the PC 2, an editor is installed that is an application program for the user to edit pages. Each page represents a single unit of print contents including at least one character. The user edits pages with the editor on the PC 2, and thereafter, provides an instruction to print the pages. In this case, a CPU (not shown) of the PC 2 transmits to the printer 1 a print command for instructing the printer 1 to print the edited pages. In the illustrative embodiment, the print command indicates the number of the pages to be printed and which medium of the tape 8 and the tube 9 the pages are to be printed on.

Further, the CPU of the PC 2 sequentially generates line-by-line print data based on the edited pages, and sequentially transmits the generated print data to the printer 1. Each piece of the line-by-line print data causes the printer 1 to print, as a print unit, a single line of the pages to be printed by the print heads 51 and 61. Thereby, a plurality of pieces of print data, required for printing all of the pages to be printed, are sequentially transmitted from the PC 2 to the printer 1. When there exist a plurality of pages to be printed, a plurality of pieces of print data, each of which represents a corresponding page, are transmitted in accordance with a sequence in which the plurality of pages are to be printed.

In the printer 1, the received print command and the received print data are stored into the receive buffer 44A. The CPU 41 reads the print command and the print data out of the receive buffer 44A in the stored order. When reading out the print command from the receive buffer 44A, the CPU 41 begins to perform below-mentioned printing operations. When reading out print data from the receive buffer 44A, the CPU 41 converts the print data into image data of a single line, based on the print dot pattern data stored in the CGROM 43. Then, the CPU 41 stores the image data generated through the conversion, into an image buffer (not shown) of the RAM 44. The CPU 41 sequentially reads out image data stored in the image buffer, and starts the following printing operations.

When reading out a print command regarding the tape 8, the CPU 41 starts a printing operation on the tape 8. As shown in FIG. 3, the conveyance motor 88 rotates the tape driving shaft 55 and the ribbon winding shaft 56, and thereby, rotates the tape driving roller 81 and the ribbon winding spool 82. Along with rotation of the tape driving roller 81, an unused tape 8 is pulled out of the tape cassette 80. Along with rotation of the ribbon winding spool 82, an unused ink ribbon is pulled out of the tape cassette 80. The pulled-out tape 8 and the pulled-out ink ribbon 86 are fed between the print head 51 and the platen roller 53.

The print head 51 prints characters on the tape 8 with the ink ribbon, based on the image data sequentially read out from the image buffer. The used ink ribbon is wound by the ribbon winding spool 82. The printed tape 8 is conveyed into the conveyance guide 23 by the movable conveyance roller 54 and the tape driving roller 81. Further, the printed tape 8 is cut by the cutter 57 on a page-by-page basis, and discharged from the tape outlet 14.

When reading out a print command regarding the tube 9, the CPU 41 starts a printing operation on the tube 9. As shown in FIG. 3, the conveyance motor 98 rotates the movable conveyance roller 62 to convey the tube 9 in the tube attachment section 40, and rotates the ribbon winding shaft 63 to rotate the ribbon winding spool 91. Along with rotation of the ribbon winding spool 91, an unused ink ribbon is pulled out of the ribbon cassette 90. The pulled-out ink ribbon is fed between the print head 61 and the movable conveyance roller 62.

The print head 61 prints characters on the tube 9 with the ink ribbon, based on the image data sequentially read out from the image buffer. The used ink ribbon is wound by the ribbon winding spool 91. The printed tube 9 is conveyed downstream of the print head 61 in the conveyance direction of the tube 9, by the movable conveyance roller 62. Further, the printed tube 9 is cut by the cutter 64 on a page-by-page basis, and discharged from the tube outlet 16.

Figure 10:
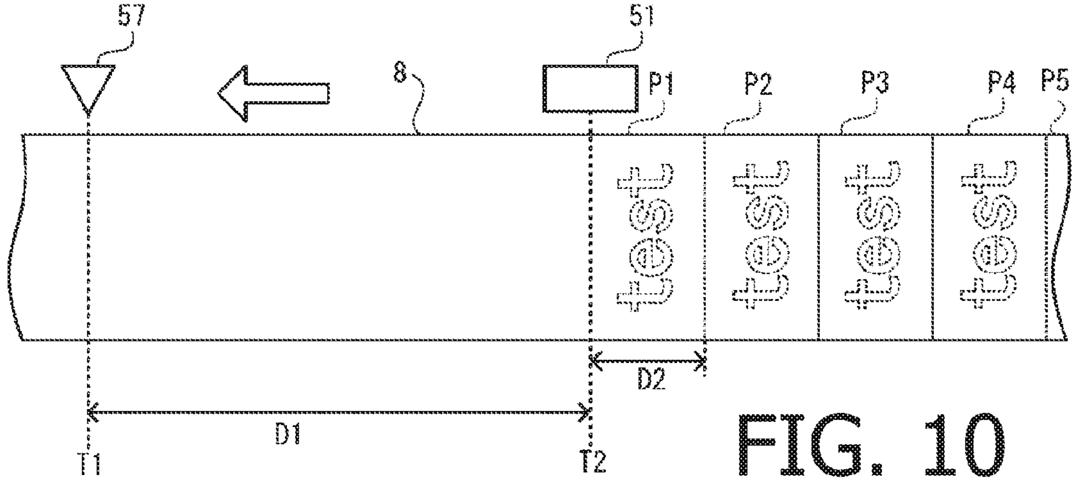
FIG. 10 is an illustration showing a positional relationship among a tape, a print head, and a cutter of the printer in the illustrative embodiment according to one or more aspects of the present disclosure.

Referring to FIGS. 5 to 12, a main process for the aforementioned printing operations will be described. In FIG. 10, a positional relationship among the tape 8, the print head 51, and the cutter 57 in a printing operation is schematically shown for the sake of easy understanding (the same applies to FIGS. 12 and 13). When reading out the print command from the receive buffer 44A, the CPU 41 launches the main process by loading and executing one or more programs 42A stored in the ROM 42. In the following description, a printing operation to be performed on the tape 8 based on the main process will be exemplified. It is noted, in this regard, that the same may apply to a printing operation to be performed on the tube 9 based on the main process.

As shown in FIG. 10, a position where the tape 8 is cut in a width direction thereof by the cutter 57 is referred to as a "cut position T1." A position where characters of a single line are printed on the tape 8 by the print head 51 is referred to as a "print position T2." The cut position T1 is located downstream of the print position T2 in the conveyance direction of the tape 8. In the illustrative embodiment, the cutter 57 half-cuts the tape 8 on a page-by-page basis. A distance between the print position T2 and the cut position T1 in the conveyance direction of the tape 8 is referred to as a "distance D1." A length of a page in the conveyance direction of the tape 8 is referred to as a "print length D2."

Figure 5:
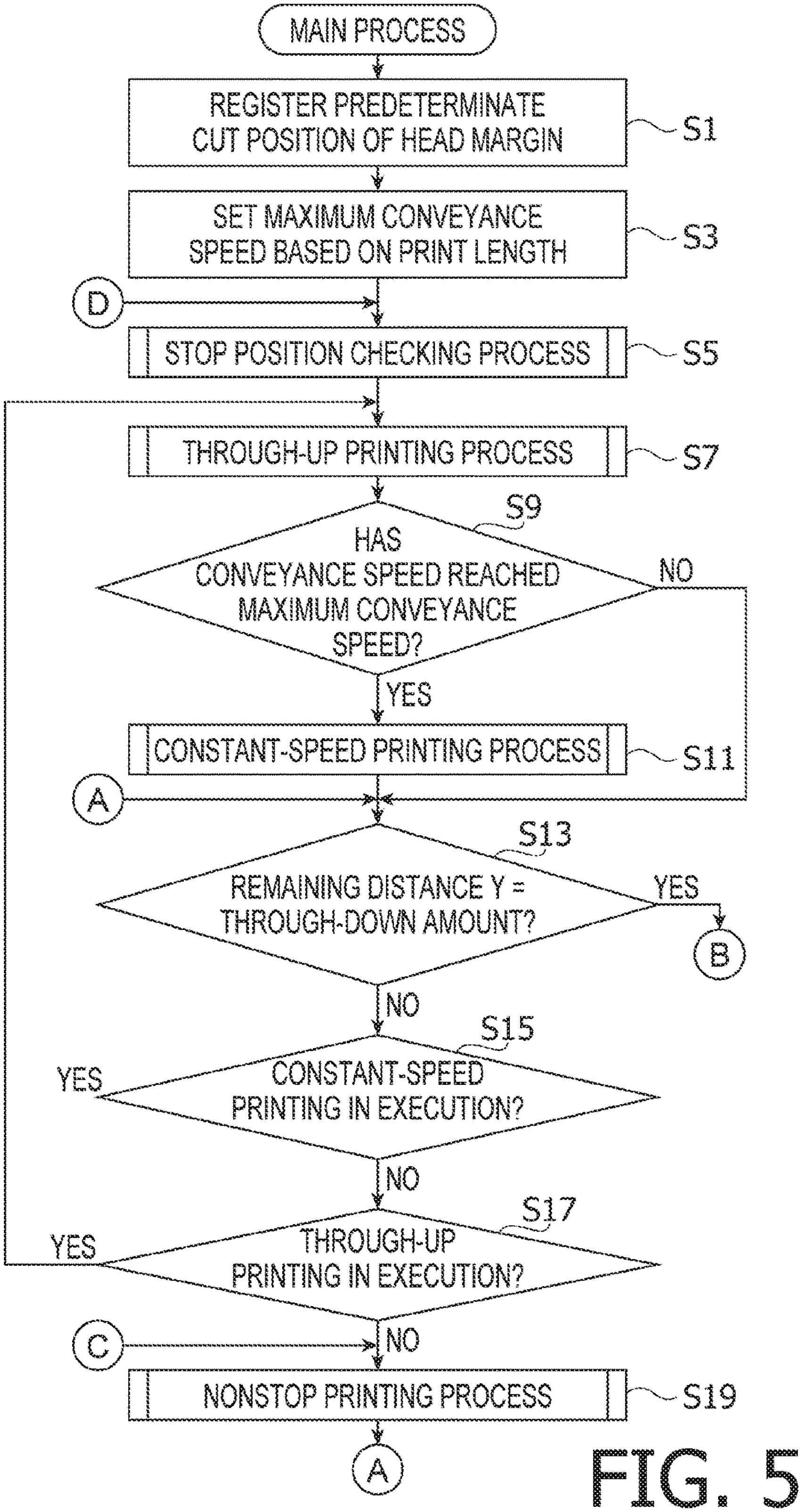
FIGS. 5 and 6 are flowcharts showing a procedure of a main process to be executed by the printer in the illustrative embodiment according to one or more aspects of the present disclosure.

As shown in FIG. 5, the CPU 41 registers a predeterminate cut position of a head margin into the RAM 44 (S1). The predeterminate cut position is a position on the tape 8 to be cut by the cutter 57. The predeterminate cut position of the head margin corresponds to a leading end portion of a page to be first printed after the start of a printing operation. Specifically, as shown in FIG. 10, at a moment when a printing operation is started, a head line of a first page P1 (i.e., the most downstream line of the first page P1 in the conveyance direction of the tape 8) is located in the print position T2. In this case, when the tape 8 is conveyed over the distance D1, the head line of the first page P1 reaches the cut position T1. Accordingly, the predeterminate cut position of the head margin is a position on the tape 8 to be cut by the cutter 57 when the tape 8 is conveyed over the distance D1 from its current position.

Subsequently, the CPU 41 sets a maximum conveyance speed of the tape 8, based on the print length of the first page P1 (S3). Specifically, the CPU 41 specifies the print length D2 of the first page P1 as a print length. The CPU 41 specifies a maximum conveyance speed corresponding to the specified print length with reference to the speed setting table 100 (see FIG. 11). The CPU 41 sets the specified maximum conveyance speed in the RAM 44. As shown in FIG. 11, on the speed setting table 100, each print length is associated with a corresponding maximum conveyance speed of the tape 8.

On the speed setting table 100, the print length and the maximum conveyance speed are defined as follows. In the illustrative embodiment, the CPU 41 begins to convey the tape 8 by pulse control of the conveyance motor 88 at the same time as when starting a printing operation with the print head 51. At this time, the conveyance speed of the tape 8 is accelerated to the maximum conveyance speed set in the RAM 44 at a particular acceleration. The CPU 41 stops the printing operation with the print head 51. At the same time, the CPU 41 stops conveying the tape 8 by pulse control of the conveyance motor 88. At this time, the conveyance speed of the tape 8 is decelerated to zero at a particular deceleration. Regardless of the maximum conveyance speed set in the RAM 44, the CPU 41 takes pulse control according to characteristics of the conveyance motor 88, so as to make constant each of the acceleration and the deceleration for the conveyance speed of the tape 8.

Print control to control the print head 51 to print at least a part of a page while controlling the conveyance motor 88 to accelerate the conveyance speed of the tape 8 at the particular acceleration is referred to as "through-up printing." Print control to control the print head 51 to print at least a part of a page while controlling the conveyance motor 88 to decelerate the conveyance speed of the tape 8 at the particular deceleration is referred to as "through-down printing." A distance over which the tape 8 is conveyed in a single operation of through-up printing is referred to as a "through-up amount." A distance over which the tape 8 is conveyed in a single operation of through-down printing is referred to as a "through-down amount."

On the speed setting table 100 shown in FIGS. 11 and 12, in association with each print length of pages printable by the printer 1, a corresponding maximum conveyance speed is defined. Each print length is equal to the sum of a through-up amount when the conveyance speed is accelerated from zero to the corresponding maximum conveyance speed and a through-down amount when the conveyance speed is decelerated from the corresponding maximum conveyance speed to zero. Accordingly, on the speed setting table 100, the larger the print length is, the higher the corresponding maximum conveyance speed is. In S3, the CPU 41 sets the maximum conveyance speed in the RAM 44, and sets in the RAM 44 a through-up amount and a through-down amount corresponding to the maximum conveyance speed. In the illustrative embodiment, each of the through-up amount and the through-down amount is half as large as the print length.

Figure 7:
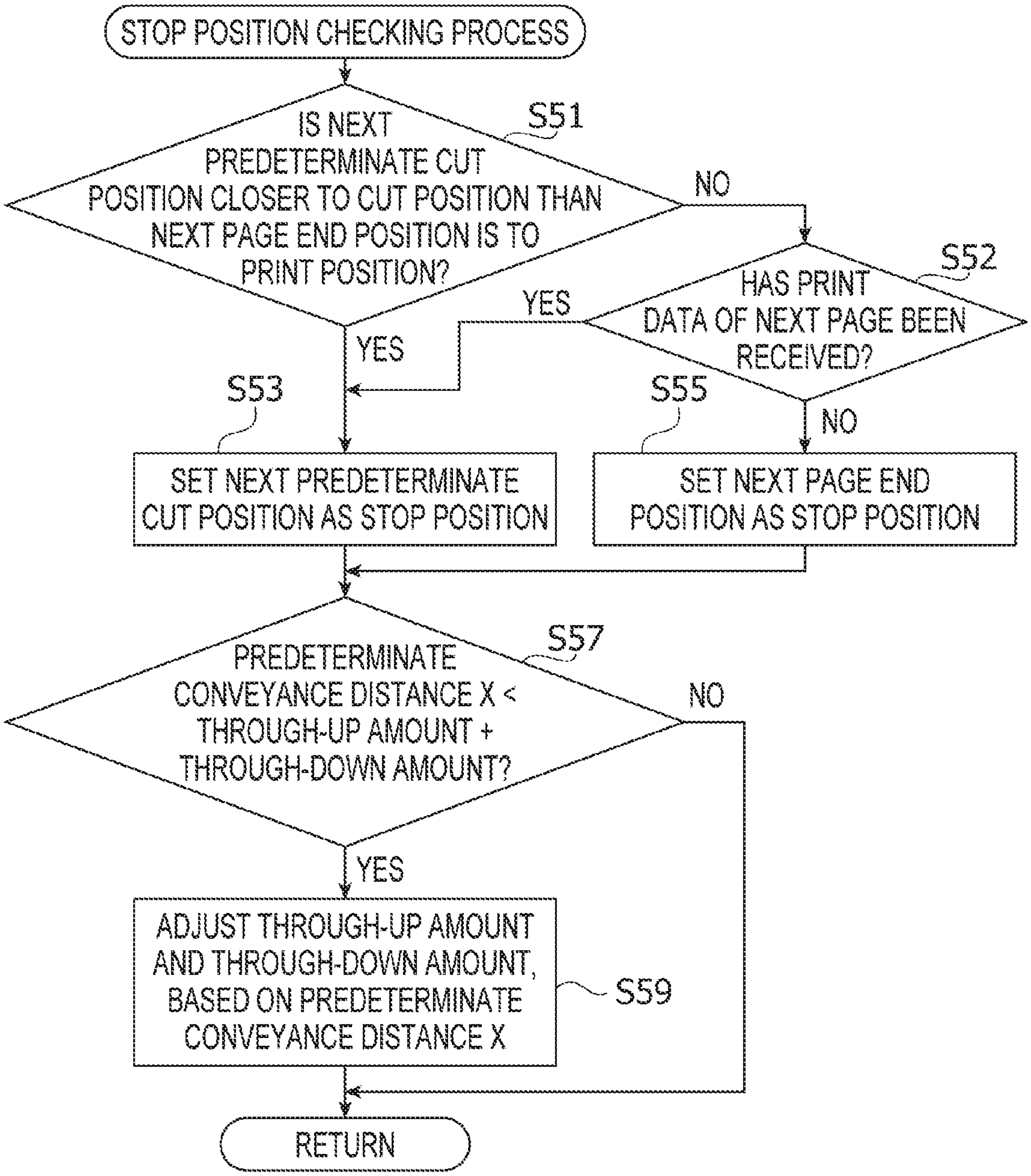
FIG. 7 is a flowchart showing a procedure of a stop position checking process to be executed by the printer in the illustrative embodiment according to one or more aspects of the present disclosure.

Subsequently, the CPU 41 performs a stop position checking process shown in FIG. 7 (S5). Firstly, the CPU 41 determines whether a next predeterminate cut position registered in the RAM 44 is closer to the cut position T1 than a next page end position is to the print position T2 (S51). The next predeterminate cut position is the closest position to the cut position T1 among predeterminate cut positions upstream of the cut position T1 in the conveyance direction. A distance between the next predeterminate cut position and the cut position T1 is referred to as a "distance L1" (see FIG. 13). The page end position is a position on the tape 8 where a printing operation for a single page by the print head 51 is completed. The next page end position is the closest position to the print position T2 among page end positions upstream of the print position T2 in the conveyance direction. A distance between the next page end position and the print position T2 is referred to as a "distance L2" (see FIG. 13).

When the distance L1 is shorter than the distance L2, the CPU 41 determines that the next predeterminate cut position is closer to the cut position T1 than the next page end position is to the print position T2 (S51: Yes). In this case, the CPU 41 sets the next predeterminate cut position as a stop position in the RAM 44 (S53). When determining that the next predeterminate cut position is not closer to the cut position T1 than the next page end position is to the print position T2 (S51: No), the CPU 41 determines whether print data of the next page has been received (S52). In the illustrative embodiment, when at least one of a plurality of pieces of print data for printing the next page is stored in the receive buffer 44A, the CPU 41 determines that print data of the next page has been received (S52: Yes). In this case, the CPU 41 sets the next predeterminate cut position as the stop position in the RAM 44 (S53). When determining that the print data of the next page has not been received (S52: No), the CPU 41 sets the next page end position as the stop position in the RAM 44 (S55).

When S53 is executed, the distance L1 is specified as a predeterminate conveyance distance X from the cut position T1 to the stop position (i.e., the next predeterminate cut position). Meanwhile, when S55 is executed, the distance L2 is specified as a predeterminate conveyance distance X from the print position T2 to the stop position (i.e., the next page end position). After execution of S53 or S55, the CPU 41 determines whether the predeterminate conveyance distance X is shorter than the sum of the through-up amount and the through-down amount (S57). Based on the maximum conveyance speed set in the RAM 44, the CPU 41 calculates the sum of the through-up amount when the conveyance speed of the tape 8 is accelerated from zero to the maximum conveyance speed in the through-up printing and the through-down amount when the conveyance speed of the tape 8 is decelerated from the maximum conveyance speed to zero in the through-down printing.

When determining that the predeterminate conveyance distance X is equal to or more than the sum of the through-up amount and the through-down amount (S57: No), the CPU 41 goes back to the main process (see FIG. 5). When the predeterminate conveyance distance X is shorter than the sum of the through-up amount and the through-down amount (S57: Yes), while the through-up printing or the through-down printing is in execution, there is a possibility that the next predeterminate cut position may reach the cut position T1 or that the next page end position may reach the print position T2. Accordingly, the CPU 41 adjusts the through-up amount and the through-down amount, based on the predeterminate conveyance distance X (S59). Specifically, the CPU 41 reduces the through-up amount and the through-down amount set in the RAM 44 so as to make the sum of the through-up amount and the through-down amount coincident with the predeterminate conveyance distance X.

Figure 8:
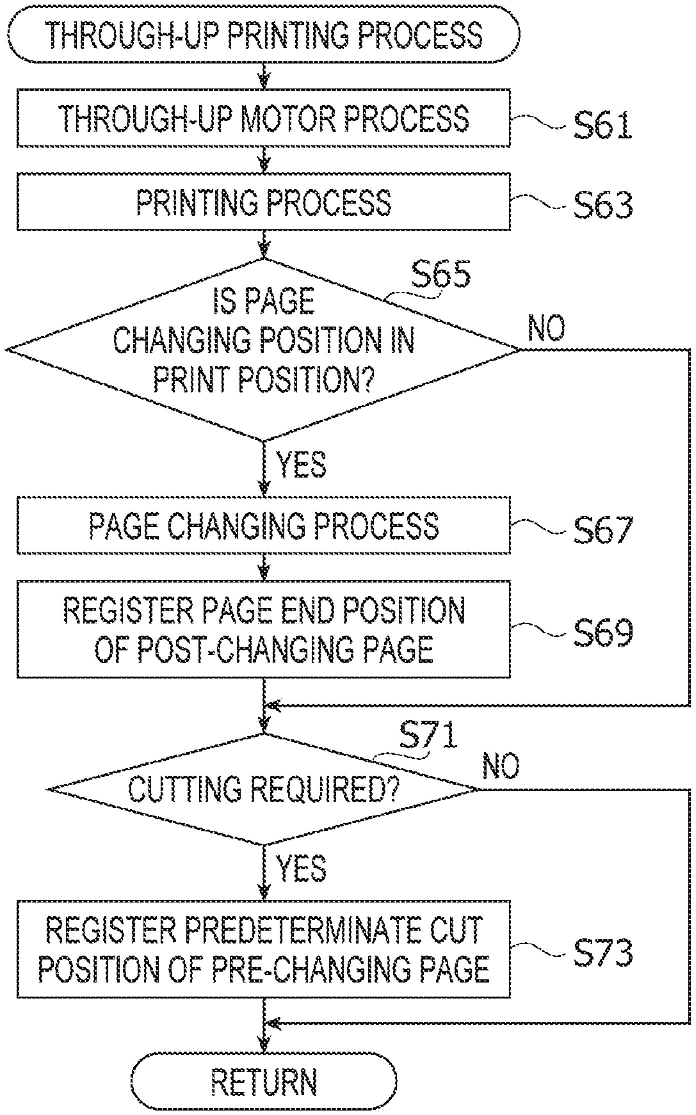
FIG. 8 is a flowchart showing a procedure of a through-up printing process to be executed by the printer in the illustrative embodiment according to one or more aspects of the present disclosure.
Figure 9:
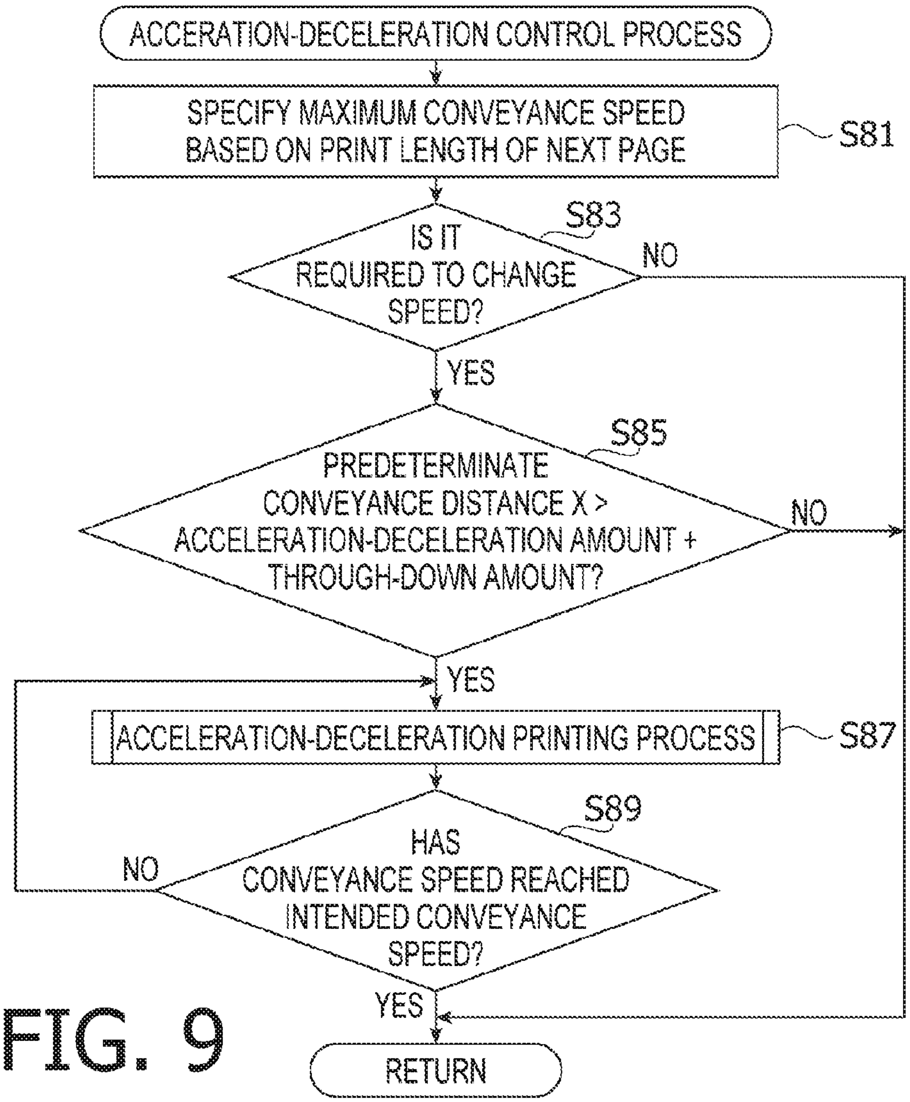
FIG. 9 is a flowchart showing a procedure of an acceleration-deceleration control process to be executed by the printer in the illustrative embodiment according to one or more aspects of the present disclosure.

As shown in FIG. 5, after execution of S5, the CPU 41 performs a through-up printing process (S7) shown in FIG. 8. Firstly, the CPU 41 performs a through-up motor process (S61). In S61, the conveyance speed of the tape 8 is accelerated at the particular acceleration by pulse control of the conveyance motor 88. Subsequently, the CPU 41 performs a printing process (S63). In S63, characters are printed on the tape 8 by the print head 51, based on image data sequentially read out from the image buffer. At this time, the CPU 41 controls the print head 51 to print the characters on the tape 8 in synchronization with the conveyance speed of the tape 8. Thereby, the through-up printing is performed.

Subsequently, the CPU 41 determines whether a page changing position on the tape 8 is currently in the print position T2 (S65). The page changing position is a page end position that, when there are a plurality of pages to be printed, indicates a boundary position between pages adjoining in the conveyance direction. When determining that a page changing position on the tape 8 is currently in the print position T2 (S65: Yes), the CPU 41 performs a page changing process (S67). For instance, in the RAM 44, the CPU 41 initializes various parameters used for each page to be printed, and/or adjusts the position of an image of a page to be next printed, relative to the tape 8 being conveyed. Further, the CPU 41 registers a page end position of a post-changing page into the RAM 44 (S69). The post-changing page is a page immediately before being printed by the print head 51. Specifically, the CPU 41 registers, into the RAM 44, a page end position indicating a position on the tape 8 that will reach the print position T2 if the tape 8 is conveyed over the print length D2 from the current position.

After execution of S69, or when determining that the page changing position on the tape 8 is not currently in the print position T2 (S65: No), the CPU 41 determines whether it is required to cut the tape 8 (S71). In the illustrative embodiment, when a page end position of a cutting target page is currently in the print position T2, the CPU 41 determines that it is required to cut the tape 8 (S71: Yes). The cutting target page is a page to be cut in a page end position thereof. The CPU 41 may determine whether the page of which the page end position is currently in the print position T2 is a cutting target page, based on the print command. In this case, the CPU 41 registers into the RAM 44 a predeterminate cut position of a pre-changing page (S73). The pre-changing page is a page immediately after having been completely printed by the print head 51. Specifically, the CPU 41 registers, into the RAM 44, a predeterminate cut position indicating a position on the tape 8 that will reach the cut position T1 if the tape 8 is conveyed over the distance D1 from the current position. After execution of S73, or when determining that it is not required to cut the tape 8 (S71: No), the CPU 41 goes back to the main process (see FIG. 5).

As shown in FIG. 5, after execution of S7, the CPU 41 determines whether the conveyance speed of the tape 8 has reached the maximum conveyance speed set in the RAM 44 (S9). When determining that the conveyance speed of the tape 8 has reached the maximum conveyance speed set in the RAM 44 (S9: Yes), the CPU 41 performs a constant-speed printing process (S11). The constant-speed printing process is a process to control the print head 51 to print at least a part of a page while controlling the conveyance motor 88 to maintain the conveyance speed of the tape 8 to be the maximum conveyance speed. In S11, firstly, the CPU 41 performs a constant-speed motor process. In the constant-speed motor process, the conveyance speed of the tape 8 is maintained to be the maximum conveyance speed set in the RAM 11, by pulse control of the conveyance motor 88. Next, the CPU 41 performs a printing process in the same manner as executed in S63 in FIG. 8. Thereby, constant-speed printing is performed. Thereafter, the CPU 41 performs the same processes as S65 to S73 in FIG. 8, and then goes back to the main process (see FIG. 5).

After execution of S11, when determining that the conveyance speed of the tape 8 has not reached the maximum conveyance speed set in the RAM 44 (S9: No), the CPU 41 determines whether a remaining distance Y is equal to the through-down amount set in the RAM 44 (S13). The remaining distance Y is a current distance from the cut position T1 to the predeterminate cut position or a current distance from the print position T2 to the page end position. More specifically, the CPU 41 determines whether the remaining distance Y is equal to one of the distance L1 and the distance L2 at the present time, based on the next predeterminate cut position and the next page end position registered in the RAM 44. When the remaining distance Y is not equal to any of the distance L1 and the distance L2 at the present time, the CPU 41 determines that the remaining distance Y is not equal to the through-down amount (S13: No). In this case, when the through-down printing is started from the present time, the conveyance speed of the tape 8 becomes zero before the stop position reaches the cut position T1 or the print position T2. Accordingly, the CPU 41 continues print control other than the through-down printing in the following manner.

The CPU 41 determines whether the constant-speed printing is in execution (S15). When determining that the constant-speed printing is in execution (S15: Yes), the CPU 41 goes back to S11 and continues the constant-speed printing. When determining that the constant-speed printing is not in execution (S15: No), the CPU 41 determines whether the through-up printing is in execution (S17). When determining that the through-up printing is in execution (S17: Yes), the CPU 41 goes back to S7 and continues the through-up printing.

When determining that the through-up printing is not in execution (S17: No), the CPU 41 performs a following nonstop printing process (S19). The nonstop printing is print control to start printing a next page continuously after completing printing of a current page, by continuing a running one of the through-up printing and the constant-speed printing. In S19, firstly, the CPU 41 performs a nonstop motor process. In the nonstop motor process, when the through-up printing is in execution, the through-up motor process (S61) is continued. Meanwhile, when the constant-speed printing is in execution, the constant-speed motor process is continued. Subsequently, the CPU 41 performs a printing process in the same manner as executed in S63 shown in FIG. 8. Thereby, the nonstop printing is performed. Thereafter, the CPU 41 performs the same processes as S65 to S73, and then goes back to the main process (see FIG. 5). As shown in FIG. 5, the CPU 41 performs S19, and then goes back to S13.

Figure 6:
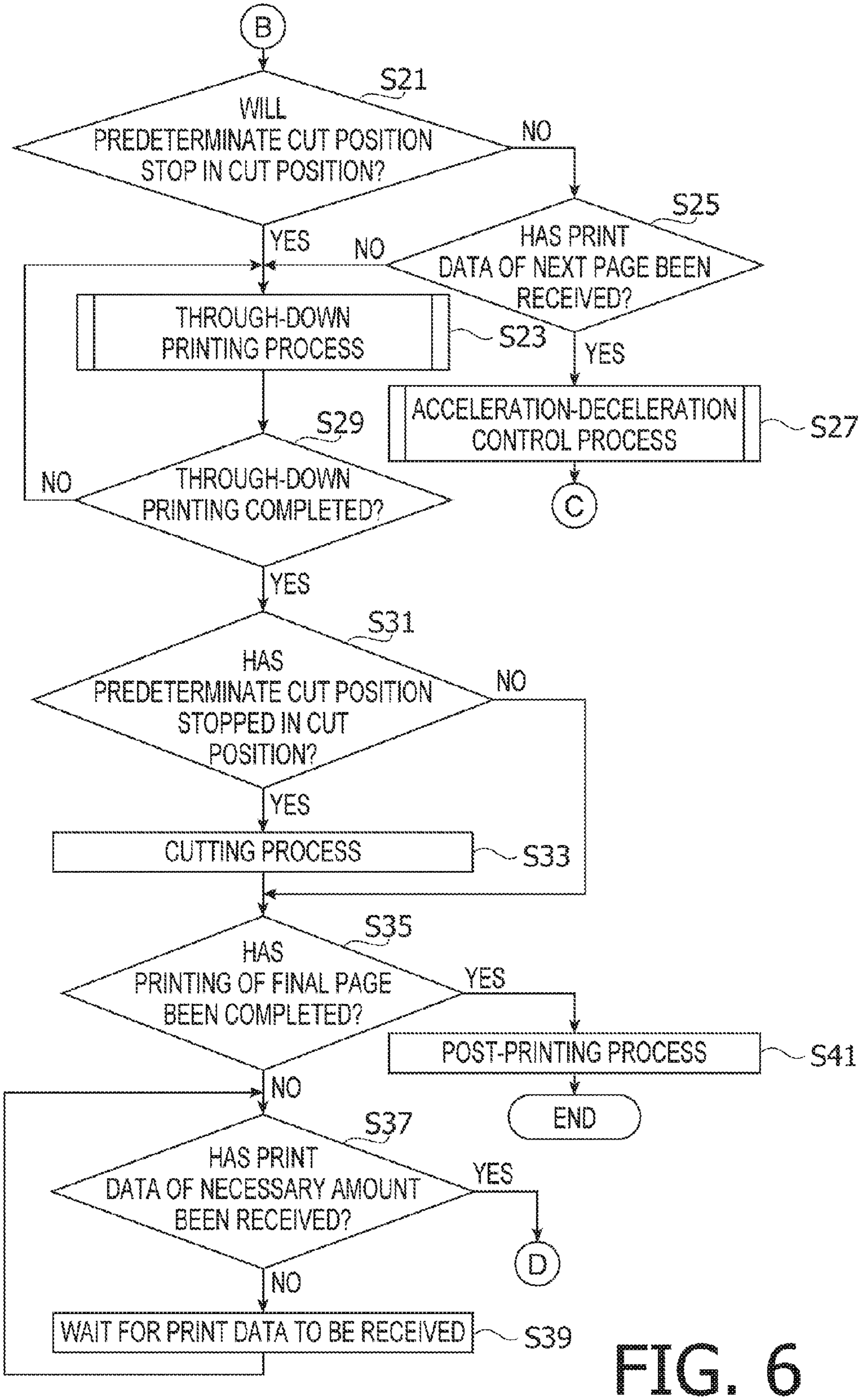

When the remaining distance Y is equal to one of the distances L1 and L2 at the present time, the CPU 41 determines that the remaining distance Y is equal to the through-down amount (S13: Yes). In this case, when the through-down printing is started from the present time, the conveyance speed of the tape 8 becomes zero at a point of time when the stop position reaches the cut position T1 or the print position T2. In this case, as shown in FIG. 6, the CPU 41 determines whether the predeterminate cut position will stop in the cut position T1 if the through-down printing is performed (S21). When determining that the predeterminate cut position will stop in the cut position T1 (S21: Yes), the CPU 41 performs a following through-down printing process (S23). In S23, firstly, the CPU 41 performs a through-down motor process. In the through-down motor process, by pulse control of the conveyance motor 88, the conveyance speed of the tape 8 is decelerated at the particular deceleration. Subsequently, the CPU 41 performs a printing process in the same manner as executed in S63 shown in FIG. 8. Thereby, the through-down printing is performed. Thereafter, the CPU 41 performs the same processes as S65 to S73 in FIG. 8, and then goes back to the main process (see FIG. 5).

When determining that the predeterminate cut position will not stop in the cut position T1 (S21: No), the CPU 41 determines whether print data of the next page has been received, in the same manner as executed in S52 (S25). When determining that print data of the next page has not been received (S25: No), the CPU 41 performs the through-down printing process (S23). When determining that print data of the next page has been received (S25: Yes), the CPU 41 performs an acceleration-deceleration control process shown in FIG. 9 (S27). Firstly, the CPU 41 specifies a maximum conveyance speed of the tape 8, based on a print length of the next page (S81). Specifically, the CPU 41 specifies the maximum conveyance speed corresponding to the print length of the next page with reference to the speed setting table 100 (see FIG. 11). Subsequently, the CPU 41 determines whether it is required to change the conveyance speed (S83). When the maximum conveyance speed (hereinafter referred to as an "intended conveyance speed") specified in S81 is different from the maximum conveyance speed set in the RAM 44, the CPU 41 determines that it is required to change the conveyance speed (S83: Yes).

In this case, the CPU 41 determines whether the predeterminate conveyance distance X is longer than the sum of an acceleration-deceleration amount and the through-down amount (S85). In the same manner as referred to in S59 shown in FIG. 7, the predeterminate conveyance distance X is the distance L1 corresponding to the next predeterminate cut position or the distance L2 corresponding to the next page end position. In S85, the CPU 41 specifies a current conveyance speed of the tape 8. When the intended conveyance speed is higher than the current conveyance speed, the CPU 41 calculates, as the acceleration-deceleration amount, a through-up amount in a case where the conveyance speed of the tape 8 is accelerated from the current conveyance speed to the intended conveyance speed in the through-up printing. When the intended conveyance speed is lower than the current conveyance speed, the CPU 41 calculates, as the acceleration-deceleration amount, a through-down amount in a case where the conveyance speed of the tape 8 is decelerated from the current conveyance speed to the intended conveyance speed in the through-down printing. Further, the CPU 41 calculates a through-down amount in a case where the conveyance speed of the tape 8 is decelerated from the intended conveyance speed to zero in the through-down printing. The CPU 41 makes the determination in S85 by comparing the predeterminate conveyance distance X with the sum of the calculated acceleration-deceleration amount and the calculated through-down amount.

When determining that the predeterminate conveyance distance X is longer than the sum of the acceleration-deceleration amount and the through-down amount (S85: Yes), the CPU 41 updates the maximum conveyance speed set in the RAM 44 to the intended conveyance speed, and performs a following acceleration-deceleration printing process (S87). The acceleration-deceleration printing is print control to control the print head 51 to print at least a part of a page while controlling the conveyance motor 88 to accelerate or decelerate the conveyance speed of the tape 8. In S87, firstly, the CPU 41 performs an acceleration-deceleration motor process. In the acceleration-deceleration motor process, when the intended conveyance speed is higher than the current conveyance speed, the through-up motor process is performed. Meanwhile, when the intended conveyance speed is lower than the current conveyance speed, the through-down motor process is performed. Subsequently, the CPU 41 performs a printing process in the same manner as executed in S63 shown in FIG. 8. Thereby, the acceleration-deceleration printing is performed. Thereafter, the CPU 41 performs the same processes as S65 to S73 in FIG. 8, and then goes back to the acceleration-deceleration control process (see FIG. 9).

After execution of S87, the CPU 41 determines whether the conveyance speed of the tape 8 has reached the intended conveyance speed (S89). When determining that the conveyance speed of the tape 8 has not reached the intended conveyance speed (S89: No), the CPU 41 goes back to S87 and continues the acceleration-deceleration printing. When determining that the conveyance speed of the tape 8 has reached the intended conveyance speed (S89: Yes), the CPU 41 goes back to the main process (see FIG. 6). Likewise, when determining that it is not required to change the conveyance speed (S83: No) or when determining that the predeterminate conveyance distance X is not longer than the sum of the acceleration-deceleration amount and the through-down amount (S85: No), the CPU 41 goes back to the main process (see FIG. 6).

As shown in FIG. 6, after execution of S27, the CPU 41 goes back to S19. Namely, after the conveyance speed of the tape 8 is changed to the intended conveyance speed in S27, the nonstop printing is performed in S19 where the tape 8 is conveyed at the intended conveyance speed. After execution of S23, the CPU 41 determines whether the through-down printing has been completed (S29). When determining that the through-down printing has been completed (S29: Yes), the CPU 41 determines whether the predeterminate cut position has stopped in the cut position T1 (S31). When determining that the predeterminate cut position has stopped in the cut position T1 (S31: Yes), the CPU 41 performs a cutting process (S33). In S33, the predeterminate cut position is cut by the cutter 57.

After execution of S33, or when determining that an actual position that has stopped in the cut position T1 is not the predeterminate cut position (S31: No), the CPU 41 determines whether printing of a final page has been completed (S35). When determining that printing of the final page has not been completed (S35: No), the CPU 41 determines whether print data of a necessary amount has been received (S37). In the illustrative embodiment, when a data amount (e.g., the number of lines) of unprinted print data stored in the receive buffer 44A is smaller than a data amount of 500 lines, the CPU 41 determines that the print data of the necessary amount has not been received (S37: No). In this case, the CPU 41 waits for the print data of the necessary amount to be received, for a particular period of time (S39) and goes back to S37. When determining that the print data of the necessary amount has been received (S37: Yes), the CPU 41 goes back to S5 and resumes the printing operation.

When determining that printing of the final page has been completed (S35: Yes), the CPU 41 performs a post-printing process (S41). For instance, when there is an unexecuted predeterminate cut position stored in the RAM 44, the CPU 41 continues to convey and cut the tape 8 until cutting has been completed for all of the predeterminate cut positions. At this time, the CPU 41 regards the distance L1 of each predeterminate cut position as a print length, and specifies a maximum conveyance speed corresponding to the distance L1, based on the speed setting table 100 (see FIG. 11). Based on the specified maximum conveyance speed, the CPU 41 performs the through-up motor process and the through-down motor process to convey the tape 8. When there is not an unexecuted predeterminate cut position stored in the RAM 44, the CPU 41 further conveys the tape 8 to discharge the printed page via the tape outlet 14 (see FIG. 3). Thereafter, the CPU 41 terminates the main process.

Referring to FIGS. 10, 13, and 14, a specific explanation will be provided of how the tape 8 is printed based on the main process. In the following description, an example will be shown in which the main process is started from a state shown in FIG. 10, and eight pages P1 to P8 each including characters "test" are continuously printed on the tape 8. In this example, each of the eight pages P1 to P8 is a cutting target page to be half-cut. The distance D1 is 22 mm. The print length D2 is 5 mm.

When the main process (see FIGS. 5 to 9) is launched, firstly, the predeterminate cut position of the head margin is registered into the RAM 44 (S1). The print length of the page P1 is 5 mm. Therefore, referring to the speed setting table 100 (see FIG. 11), a maximum conveyance speed of "60 mm/s" is registered into the RAM 44 (S3). Further, as each of a through-up amount and a through-down amount, "2.5 mm" is registered into the RAM 44. In the present example, at this point of time, print data of the page P2 has been received (S52: Yes). Therefore, the predeterminate cut position of the head margin is set as a stop position (S53). In this case, the predeterminate conveyance distance X to the stop position is "22 mm," which is identical to the distance D1. Hence, the predeterminate conveyance distance X is longer than "5 mm" that is the sum of the through-up amount and the through-down amount for the maximum conveyance speed "60 mm/s" (S57: No).

Subsequently, through-up printing is performed for the page P1 (S7). When through-up printing of "2.5 mm" is performed for the page P1, the conveyance speed of the tape 8 reaches the maximum conveyance speed "60 mm/s," and constant-speed printing is performed for the page P1 (S11). At this time, the remaining distance Y from the print position T2 to a page end position of the page P1 is "2.5 mm," which is identical to the through-down amount (S13: Yes, and S21: No). In the present example, at a point of time when the through-up printing for the page P1 is completed, print data of the page P2 has been received (S25: Yes). Accordingly, the acceleration-deceleration control process (S27) is performed. At this time, since the print length of the page P2 is equal to the print length of the page P1, the maximum conveyance speed is not changed (S81, and S83: No).

Thereafter, nonstop printing is performed for the page P1, and the constant-speed printing for the page P1 is continued (S19). As shown in a state Fl of FIG. 13, in the nonstop printing, when the page end position of the page P1 reaches the print position T2, the printing of the page P1 is completed, and an object to be printed is switched to the page P2. At this time, a page end position of the page P2 and a predeterminate cut position of the page P1 are registered into the RAM 44 (see S65 to S73).

Thereafter, as shown in a state F2 of FIG. 13, the nonstop printing (S19) is continued in the same manner as described above, and printing of the pages P2 and P3 is completed, and further, printing of the page P4 is started. During the printing of the page P4, the remaining distance Y from the cut position T1 to the predeterminate cut position of the head margin becomes "2.5 mm" that is identical to the through-down amount (S13: Yes, and S21: Yes). Accordingly, through-down printing is performed, and a remainder of the page P4 and a part of the page P5 are printed (S23). At a point of time when the through-down printing is completed, the conveyance of the tape 8 is stopped, and the predeterminate cut position of the head margin is in the cut position T1 (S29: Yes, and S31: Yes). The predeterminate cut position of the head margin is half-cut by the cutter 57 (S33). In the present example, at this point of time, print data of the page P3 has been received (S52: Yes). Therefore, the predeterminate cut position of the page P1 is set as a stop position (S53). In this case, the predeterminate conveyance distance X to the stop position is "5 mm," which is identical to the print length D2. Hence, the predeterminate conveyance distance X is equal to "5 mm" that is the sum of the through-up amount and the through-down amount for the maximum conveyance speed "60 mm/s" (S57: No).

Thereafter, as shown in a state F3 of FIG. 13, when through-up printing of "2.5 mm" is performed for the page P5, the conveyance speed of the tape 8 reaches the maximum conveyance speed "60 mm/s," and constant-speed printing for the page P5 is started (S11). At this time, the remaining distance Y from the cut position T1 to the predeterminate cut position of the page P1 is "2.5 mm," which is identical to the through-down amount (S13: Yes, and S21: Yes). Accordingly, through-down printing is performed, and a remainder of the page P5 and a part of the page P6 are printed (S23). At a point of time when the through-down printing is completed, the conveyance of the tape 8 is stopped, and the predeterminate cut position of the page P1 is in the cut position T1 (S29: Yes, and S31: Yes). The predeterminate cut position of the page P1 is half-cut by the cutter 57 (S33).

Next, the distance L1 from the cut position T1 to a predeterminate cut position of the page P2 is longer than the distance L2 from the print position T2 to a page end position of the page P6 (S51: No). Further, in the present example, at this point of time, print data of the page P7 has not been received (S52: No). Accordingly, the page end position of the page P6 is set as a stop position (S55). In this case, the predeterminate conveyance distance X from the print position T2 to the page end position of the page P6 is "3 mm," which corresponds to the distance L2. Therefore, the predeterminate conveyance distance X is shorter than "5 mm" that is the sum of the through-up amount and the through-down amount for the maximum conveyance speed "60 mm/s" (S57: Yes). Accordingly, each of the through-up amount and the through-down amount is reduced to "1.5 mm" (S59).

Thereafter, as shown in a state F4 of FIG. 14, while through-up printing is being performed for a remainder of the page P6, the remaining distance Y from the print position T2 to the page end position of the page P6 becomes "1.5 mm" that is identical to the through-down amount (S13: Yes, and S21: No). In the present example, at this point of time, print data of the page P7 has not been received (S25: No). Accordingly, through-down printing is performed, and the remainder of the page P6 is printed (S23). At a point of time when the through-down printing is completed, the conveyance of the tape 8 is stopped, and the page end position of the page P6 is in the print position T2 (S23, and S29: Yes).

Thereafter, when print data of a necessary amount has been received (S37: Yes), the printing operation is resumed. In the present example, at this point of time, the distance L1 from the cut position T1 to the predeterminate cut position of the page P2 is shorter than the distance L2 from the print position T2 to a page end position of the page P7 (S51: Yes). Therefore, the predeterminate cut position of the page P2 is set as a stop position (S53). In this case, the predeterminate conveyance distance X to the stop position is "2 mm," as shown in the state F4 of FIG. 14. Hence, the predeterminate conveyance distance X is shorter than the sum of the through-up amount and the through-down amount set in the RAM 44 (S57: Yes). Accordingly, each of the through-up amount and the through-down amount is reduced to "1.0 mm" (S59).

Thereafter, as shown in a state F5 of FIG. 14, through-up printing of "1.0 mm" is performed for the page P7 (S7). At a point of time when the through-up printing is completed, the remaining distance Y from the cut position T1 to the predeterminate cut position of the page P2 is "1.0 mm," which is identical to the through-down amount (S13: Yes, and S21: Yes). Accordingly, through-down printing is performed for the page P7 (S23). At a point of time when the through-down printing is completed, the conveyance of the tape 8 is stopped, and the predeterminate cut position of the page P2 is in the cut position T1 (S29: Yes, and S31: Yes). The predeterminate cut position of the page P2 is half-cut by the cutter 57 (S33).

Next, the distance L1 from the cut position T1 to a predeterminate cut position of the page P3 is longer than the distance L2 from the print position T2 to the page end position of the page P7 (S51: No). Further, in the present example, at this point of time, print data of the page P8 has been received (S52: Yes). Accordingly, the predeterminate cut position of the page P3 is set as a stop position (S53). In this case, the predeterminate conveyance distance X from the cut position T1 to the predeterminate cut position of the page P3 is "5 mm." Therefore, the predeterminate conveyance distance X is not shorter than the sum (i.e., 2 mm) of the through-up amount and the through-down amount set in the RAM 44 (S57: No).

Thereafter, when through-up printing of "1.0 mm" is performed for the page P7 (S7), the conveyance speed of the tape 8 reaches the maximum conveyance speed (S9: Yes), and constant-speed printing is performed for the page P7 (S11). While the constant-speed printing is being performed for the page P7, the remaining distance Y from the print position T2 to the page end position of the page P7 becomes "1.0 mm," which is identical to the through-down amount (S13: Yes). At this point of time, the print data of the page P8 has been received (S25: Yes). Therefore, via the acceleration-deceleration control process (S27), nonstop printing is performed for a remainder of the page P7 and a part of the page P8 (S19). While the nonstop printing is being performed, the remaining distance Y from the cut position T1 to the predeterminate cut position of the page P3 becomes "1.0 mm," which is identical to the through-down amount (S13: Yes, and S21: Yes). Accordingly, through-down printing is performed for the page P8 (S23). At a point of time when the through-down printing is completed, the conveyance of the tape 8 is stopped, and the predeterminate cut position of the page P3 is in the cut position T1 (S29: Yes, and S31: Yes). The predeterminate cut position of the page P3 is half-cut by the cutter 57 (S33).

Further, in the same manner as executed for the page P7, a remainder of the page P8 is printed by through-up printing, constant-speed printing, and through-down printing. When the final page P8 has been printed (S35: Yes), the post-printing process (S41) is performed. Namely, as shown in a state F6 of FIG. 14, after respective predeterminate cut positions of the remaining pages P4 to P8 are sequentially half-cut, the printed pages P1 to P8 are discharged via the tape outlet 14.

Referring to each of FIGS. 15 to 20, an explanation will be provided of a relationship between a conveyance time and the conveyance speed of the tape 8 in a printing operation based on the aforementioned main process. In FIGS. 15 to 20, an X-axis represents the conveyance time of the tape 8, and a Y-axis represents the conveyance speed of the tape 8.

Figure 15:
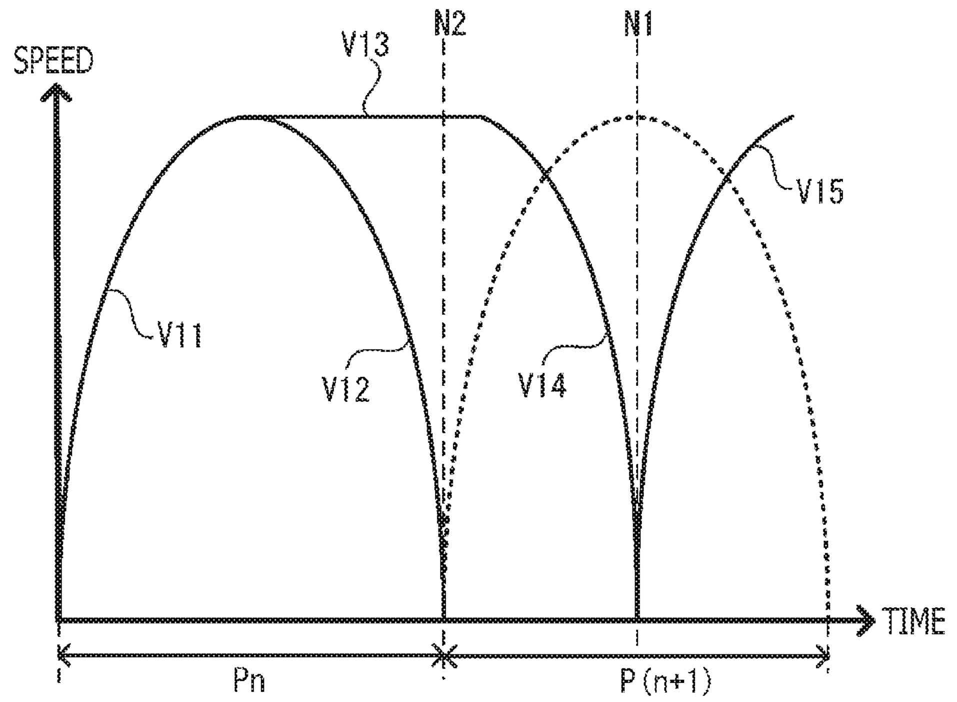

FIG. 15 exemplifies a relationship between the conveyance time and the conveyance speed of the tape 8 in a basic printing operation based on the main process. In the example shown in FIG. 15, firstly, through-up printing V11 for a page Pn is performed (S7). At a point of time when the conveyance speed of the tape 8 reaches the maximum conveyance speed, when print data of a next page has not been received, through-down printing V12 for the page Pn is performed (S13: Yes, S25: No, and S23). Thereby, a page end position N2 of the page Pn stops in the print position T2.

Meanwhile, at the point of time when the conveyance speed of the tape 8 reaches the maximum conveyance speed, when the print data of the next page has been received, nonstop printing V13 is performed (S13: Yes, S25: Yes, and S19). By the nonstop printing V13, a page P(n+1), following the page Pn, is printed in a state where the tape 8 is being conveyed at the maximum conveyance speed. During the execution of the nonstop printing V13, when the predeterminate conveyance distance X from the cut position T1 to the predeterminate cut position N1 of the printed page is coincident with the through-down amount, through-down printing V14 is performed (S13: Yes, S21: Yes, and S23). Thereby, the predeterminate cut position N1 stops in the cut position T1 and is cut by the cutter 57 (S33). Thereafter, through-up printing V15 is performed, and a remainder of the page P(n+1) is printed (S7).

Figure 16:
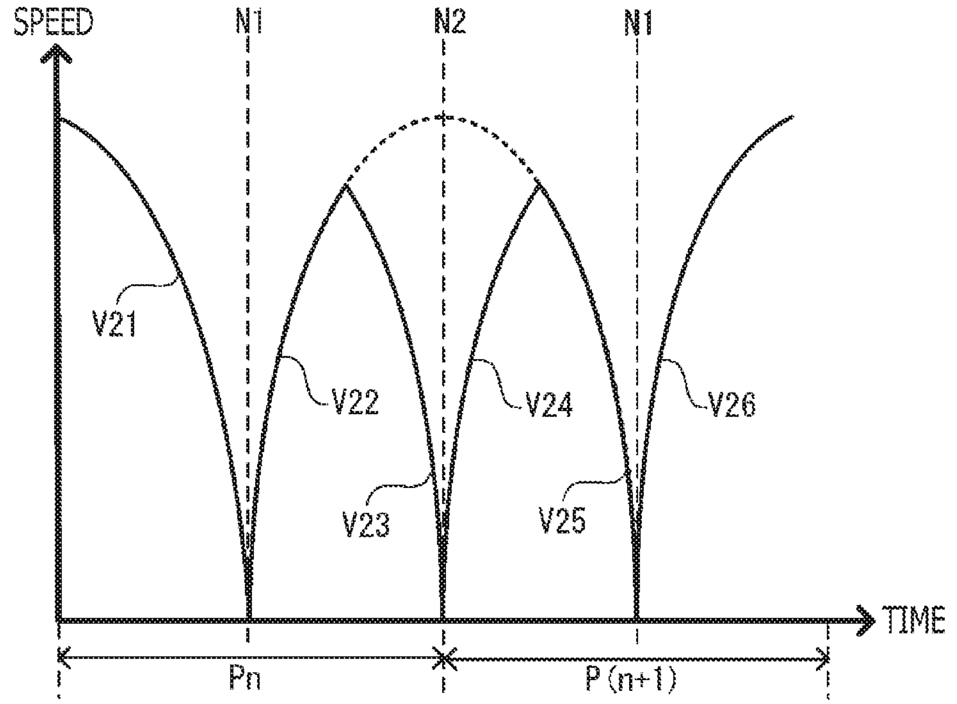

FIG. 16 exemplifies a relationship between the conveyance time and the conveyance speed of the tape 8 in a printing operation based on the main process in a case where the distance between a predeterminate cut position N1 and a page end position N2 adjacent to each other in the conveyance direction is shorter than the sum of a through-up amount and a through-down amount. In the example shown in FIG. 16, the predeterminate cut position N1 of a printed page stops in the cut position T1 by through-down printing V21 and is cut by the cutter 57 (S23 and S33). In the present example, at a point of time when the through-down printing V21 is completed, print data of a necessary amount has been received (S37: Yes). Nonetheless, print data of the page P(n+1) has not been received (S52: No). Therefore, the page end position N2 of the page Pn is set as a stop position (S55).

Further, the predeterminate conveyance distance X from the predeterminate cut position N1 to the page end position N2 is shorter than a sum V29 (S57: Yes). It is noted that the sum V29 is the sum of the through-up amount of through-up printing for increasing the conveyance speed of the tape 8 from zero to the maximum conveyance speed and the through-down amount of through-down printing for reducing the conveyance speed of the tape 8 from the maximum conveyance speed to zero. Accordingly, a through-up amount of through-up printing V22 and a through-down amount of through-down printing V23 are reduced until the sum of them becomes coincident with the predeterminate conveyance distance X (S59).

Thereafter, the through-up printing V22 is performed, and the remainder of the page Pn is printed (S7). During the execution of the through-up printing V22, when the predeterminate conveyance distance X from the print position T2 to the page end position N2 is coincident with the through-down amount of the through-down printing V23, the through-down printing V23 is performed (S13: Yes, S25: No, and S23). Thereby, the page end position N2 stops in the print position T2. Next, when print data of the necessary amount has been received (S37: Yes), the predeterminate cut position of the printed page is set as a stop position (S51: Yes, and S53). In the same manner as described above, a through-up amount of through-up printing V24 and a through-down amount of through-down printing V25 are reduced until the sum of them becomes coincident with the predeterminate conveyance distance X (S57: Yes, and S59).

Thereafter, the through-up printing V24 is performed, and a part of the page P(n+1) is printed (S7). During the execution of the through-up printing V24, when the predeterminate conveyance distance X from the cut position T1 to the predeterminate cut position N1 is coincident with the through-down amount of the through-down printing V25, the through-down printing V25 is performed (S13: Yes, S25: No, and S23). Thereby, the predeterminate cut position N1 stops in the cut position T1 and is cut by the cutter 57 (S33). Thereafter, through-up printing V26 is performed, and the remainder of the page P(n+1) is printed (S33).

Figure 17:
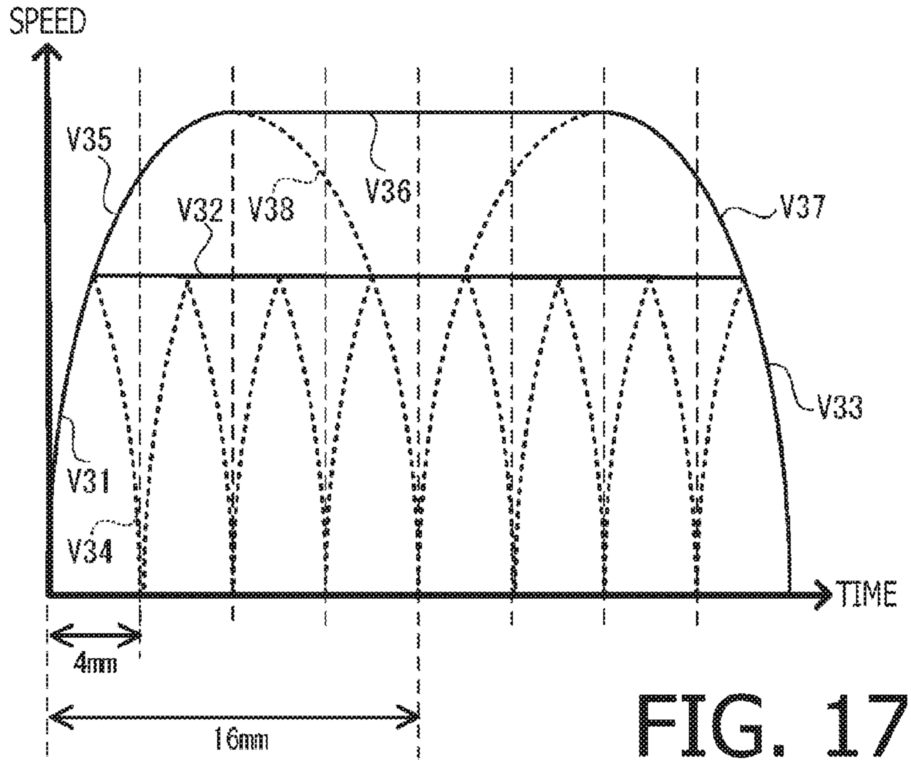

FIG. 17 exemplifies a relationship between a print length D2 of each page and a corresponding maximum conveyance speed of the tape 8, in the main process. On the sake of easy understanding, FIG. 17 exemplifies a case where pages are not individually cut (the same applies to FIGS. 18 to 20). In the example shown in FIG. 17, when eight pages each having a print length of "4 mm" are continuously printed, a maximum conveyance speed of "50 mm/s" is set based on the speed setting table 100 (see FIG. 11) (S3). Subsequently, through-up printing V31 for the first page is performed (S7). For instance, in a case where a printing operation is not temporarily stopped each time printing of an individual page is completed, when the conveyance speed of the tape 8 reaches the maximum conveyance speed "50 mm/s," nonstop printing V32 is performed from the second half of the first page to the first half of the eighth page (S19). Finally, the second half of the eighth page is printed by through-down printing V33 (S23).

Meanwhile, in a case where the printing operation is temporarily stopped each time printing of an individual page is completed, when the conveyance speed of the tape 8 reaches the maximum conveyance speed "50 mm/s," through-down printing V34 is performed (S13: Yes, S21: Yes, and S23). Thus, the through-up printing V31 and the through-down printing V34 are alternately and repeatedly performed over the consecutive eight pages. Thereby, each time the through-down printing V34 is performed, the page end position N2 of each page stops in the print position T2.

When two pages each having a print length of "16 mm" are consecutively printed, a maximum conveyance speed of "90 mm/s" is set based on the speed setting table 100 (see FIG. 11) (S3). Subsequently, through-up printing V35 of the first page is performed (S7). For instance, in a case where a printing operation is not temporarily stopped each time printing of an individual page is completed, when the conveyance speed of the tape 8 reaches the maximum conveyance speed "90 mm/s," nonstop printing V36 is performed from the second half of the first page to the first half of the second page (S19). Finally, the second half of the second page is printed by through-down printing V37 (S23).

Meanwhile, in a case where a printing operation is temporarily stopped each time printing of an individual page is completed, when the conveyance speed of the tape 8 reaches the maximum conveyance speed "90 mm/s," through-down printing V38 is performed (S13: Yes, S21: Yes, and S23). Thus, the through-up printing V35 and the through-down printing V38 are alternately and repeatedly performed over the consecutive two pages. Thereby, each time the through-down printing V38 is performed, the page end position N2 of each page stops in the print position T2.

Figure 18:
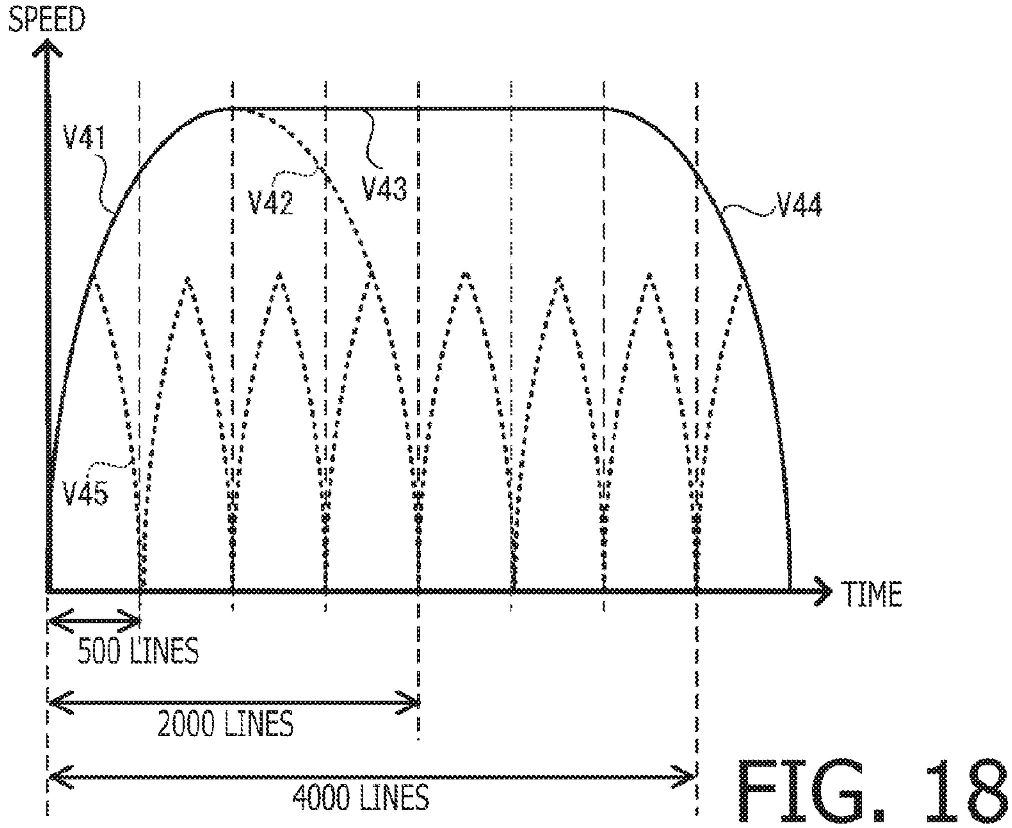

FIG. 18 exemplifies a relationship between a print length D2 of each page and a corresponding maximum conveyance speed of the tape 8 in a modification of the main process. In the modification, on the speed setting table 100 (see FIG. 11), the maximum conveyance speed is defined in association with received data amount instead of the print length. A conveyance distance of the tape 8 corresponding to each received data amount is equal to the sum of a through-up amount when the conveyance speed is accelerated from zero to a corresponding maximum conveyance speed and a through-down amount when the conveyance speed is decelerated from the corresponding conveyance speed to zero. The received data amount is an amount of unprocessed (unprinted) print data stored in the receive buffer 44A. In the example shown in FIG. 18, in a case where a received data amount when a printing operation is started is "2000 lines," a maximum conveyance speed of "90 mm/s" is set based on the speed setting table 100 (see FIG. 11) (S3).

Subsequently, through-up printing V41 is performed (S7). At a point of time when the conveyance speed of the tape 8 reaches the maximum conveyance speed "90 mm/s," print data of "1000 lines" of the received data amount has been printed. When new print data is not stored in the receive buffer 44A at this point of time, remaining print data of "1000 lines" is printed by through-down printing V42 (S23). Meanwhile, at the point of time when the conveyance speed of the tape 8 reaches the maximum conveyance speed "90 mm/s," when new print data of "2000 lines" is stored in the receive buffer 44A, nonstop printing V43 of "2000 lines" is performed (S19). Finally, remaining print data of "1000 lines" is printed by through-down printing V44 (S23).

Meanwhile, in a case where a received data amount when a printing operation is started is "500 lines," a maximum conveyance speed of "50 mm/s" is set based on the speed setting table 100 (see FIG. 11) (S3). Subsequently, the through-up printing V41 is performed (S7). At a point of time when the conveyance speed of the tape 8 reaches the maximum conveyance speed "50 mm/s," print data of "250 lines" of the received data amount has been printed. When new print data is not stored in the receive buffer 44A at this point of time, remaining print data of "250 lines" is printed by through-down printing V45 (S23).

In the modification, in S25, the CPU 41 determines whether new print data has been additionally stored into the receive buffer 44A, instead of determining whether print data of the next page has been received. When determining that new print data has been additionally stored into the receive buffer 44A (S25: Yes), the CPU 41 goes to the nonstop printing process (S19), and continues a running one of the through-up printing process and the constant-speed printing process, for a distance corresponding to a data amount of the new print data. Further, in the acceleration-deceleration control process in S27, instead of specifying the maximum conveyance speed based on the print length of the next page, the CPU 41 specifies an intended conveyance speed, based on the current received data amount in the same manner as described above, and accelerates or decelerates the conveyance speed to the intended conveyance speed.

Figure 19:
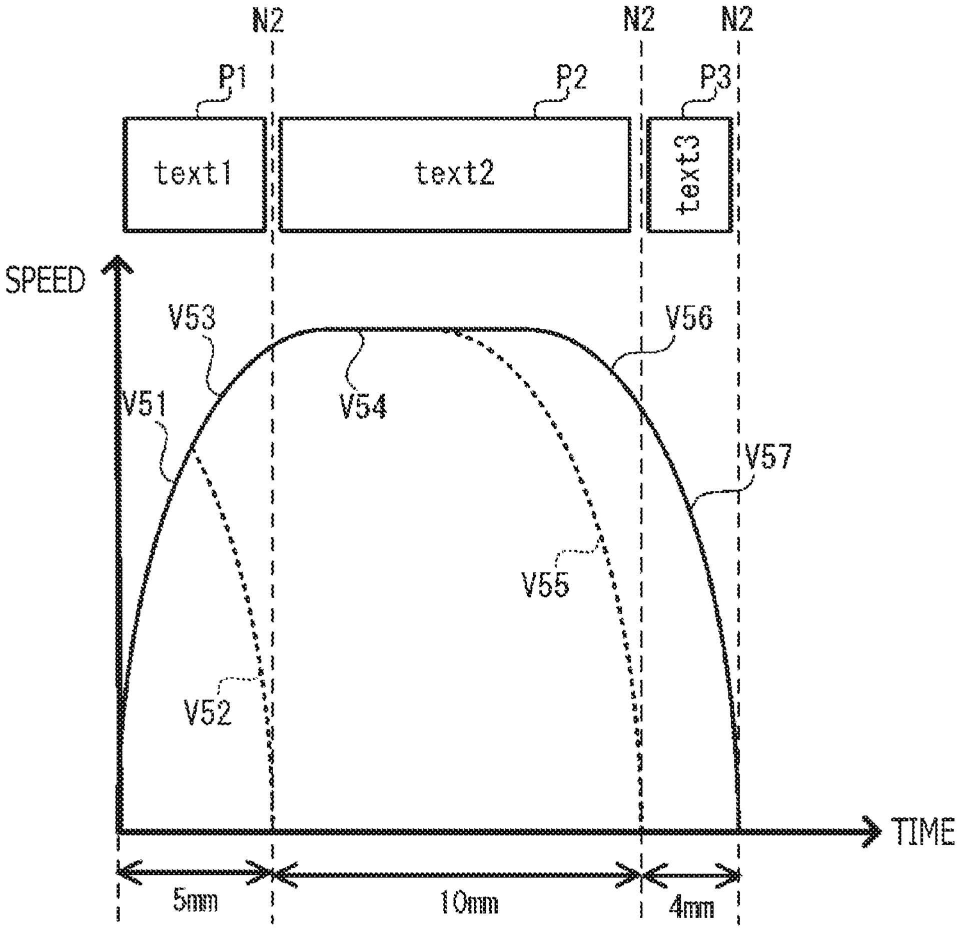
Figure 20:
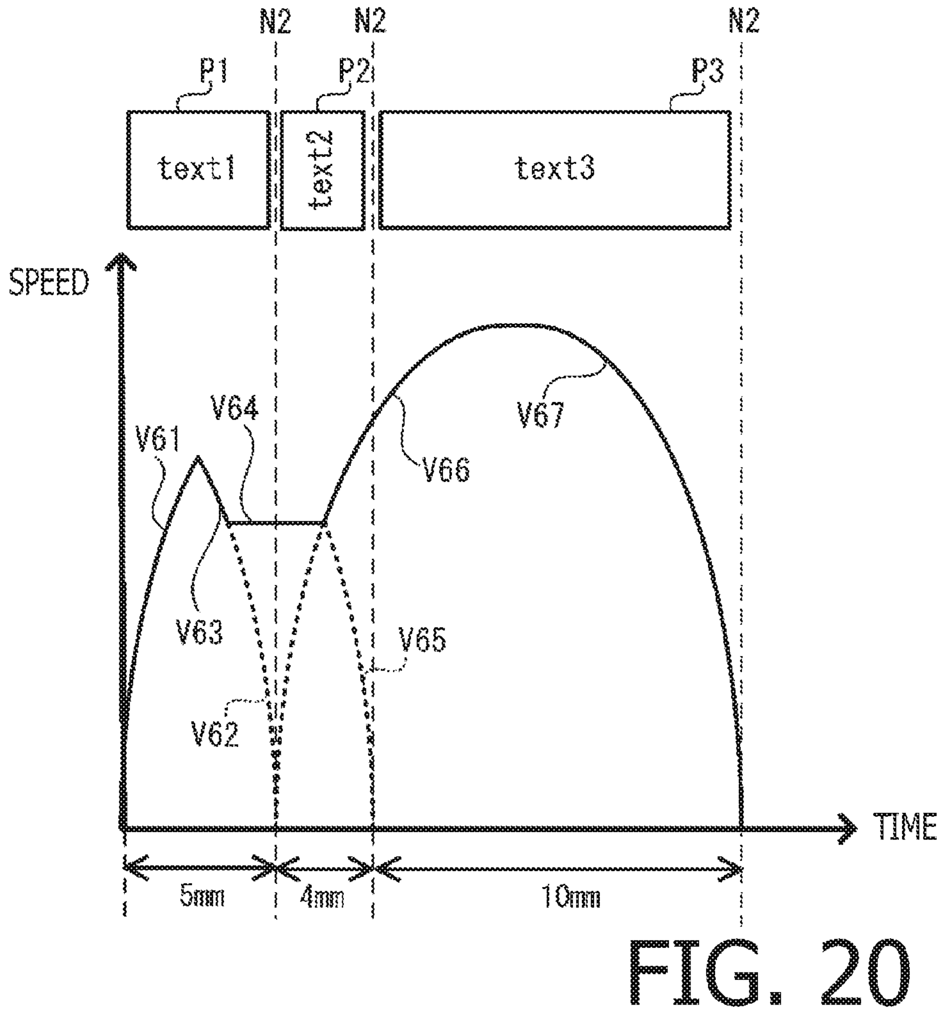

Each of FIGS. 19 and 20 exemplifies a relationship between the conveyance time and the conveyance speed of the tape 8 in a printing operation based on the main process when a plurality of pages have varying print lengths. In the examples shown in FIGS. 19 and 20, three pages P1 to P3 are printed. In the example shown in FIG. 19, print lengths of the pages P1, P2, and P3 are "5 mm," "10 mm," and "4 mm." In this case, based on the speed setting table 100 (see FIG. 11), the maximum conveyance speed "60 mm/s" corresponding to the print length “5 mm” of the page P1 is set (S3). Subsequently, through-up printing V51 for the page P1 is performed (S7). In a case where the print data of the page P2 has not been received when the through-up printing V51 is completed, through-down printing V52 for the page P1 is performed (S13: Yes, S25: No, and S23). Thereby, the page end position N2 of the page P1 stops in the print position T2.

In a case where the print data of the page P2 has been received when the through-up printing V51 is completed, the acceleration-deceleration control process is performed (S27). Namely, based on the print length “10 mm” of the page P2, a maximum conveyance speed of “80 mm/s” is specified (S81). In this case, it is required to change the maximum conveyance speed from “60 mm/s” to “80 mm/s” (S83). In the present example, the predeterminate conveyance distance X from the print position T2 to the page end position N2 of the page P2 is longer than the sum of a through-up amount of acceleration-deceleration printing V53 for accelerating the conveyance speed of the tape 8 from “60 mm/s” to “80 mm/s” and a through-down amount of through-down printing V55 for decelerating the conveyance speed of the tape 8 from “80 mm/s” to “0 mm/s” (S85: Yes). Therefore, the acceleration-deceleration printing V53 is performed, and the conveyance speed of the tape 8 is accelerated from “60 mm/s” to “80 mm/s” (S87, and S89: Yes).

Subsequently, when the conveyance speed of the tape 8 reaches “80 mm/s,” nonstop printing V54 is performed (S19). When print data of the page P3 has not been received during the execution of the nonstop printing V54, in response to the predeterminate conveyance distance X from the print position T2 to the page end position N2 of the page P2 becoming coincident with the through-down amount of the through-down printing V55, the through-down printing V55 is performed (S13: Yes, S25: No, and S23). Thereby, the page end position N2 of the page P2 stops in the print position T2.

Meanwhile, when the print data of the page P3 has been received during the execution of the nonstop printing V54, the acceleration-deceleration control process is performed (S27). Namely, based on the print length “4 mm” of the page P3, the maximum conveyance speed “50 mm/s” is specified (S81). In this case, it is required to change the maximum conveyance speed from “80 mm/s” to “50 mm/s” (S83). In the present example, the predeterminate conveyance distance X from the print position T2 to a page end position N2 of the page P3 is longer than the sum of a through-down amount of acceleration-deceleration printing V56 for decelerating the conveyance speed of the tape 8 from “80 mm/s” to “50 mm/s” and a through-down amount of through-down printing V57 for decelerating the conveyance speed of the tape 8 from “50 mm/s” to “0 mm/s” (S85: Yes). Therefore, the acceleration-deceleration printing V56 is performed, and the conveyance speed of the tape 8 is decelerated from “80 mm/s” to “50 mm/s” (S87, and S89: Yes). Further, the through-down printing V57 is performed (S13: Yes, S25: No, and S23), and the page end position N2 of the page P3 stops in the print position T2.

In the example shown in FIG. 20, print lengths of the pages P1, P2, and P3 are “5 mm,” “4 mm,” and “10 mm.” In this case, based on the speed setting table 100 (see FIG. 11), the maximum conveyance speed “60 mm/s” corresponding to the print length “5 mm” of the page P1 is set (S3). Subsequently, through-up printing V61 for the page P1 is performed (S7). In a case where the print data of the page P2 has not been received when the through-up printing V61 is completed, through-down printing V62 for the page P1 is performed (S13: Yes, S25: No, and S23). Thereby, the page end position N2 of the page P1 stops in the print position T2.

In a case where the print data of the page P2 has been received when the through-up printing V61 is completed, the acceleration-deceleration control process is performed (S27). Namely, based on the print length “4 mm” of the page P2, the maximum conveyance speed “50 mm/s” is specified (S81). In this case, it is required to change the maximum conveyance speed from “60 mm/s” to “50 mm/s” (S83). In the present example, the predeterminate conveyance distance X from the print position T2 to the page end position N2 of the page P2 is longer than the sum of a through-down amount of acceleration-deceleration printing V63 for decelerating the conveyance speed of the tape 8 from “60 mm/s” to “50 mm/s” and a through-down amount of through-down printing V65 for decelerating the conveyance speed of the tape 8 from “50 mm/s” to “0 mm/s” (S85: Yes). Therefore, the acceleration-deceleration printing V63 is performed, and the conveyance speed of the tape 8 is decelerated from “60 mm/s” to “50 mm/s” (S87, and S89: Yes).

Subsequently, when the conveyance speed of the tape 8 reaches “50 mm/s,” nonstop printing V64 is performed (S19). When print data of the page P3 has not been received during the execution of the nonstop printing V64, in response to the predeterminate conveyance distance X from the print position T2 to the page end position N2 of the page P2 becoming coincident with the through-down amount of the through-down printing V65, the through-down printing V65 is performed (S13: Yes, S25: No, and S23). Thereby, the page end position N2 of the page P2 stops in the print position T2.

Meanwhile, when the print data of the page P3 has been received during the execution of the nonstop printing V64, the acceleration-deceleration control process is performed (S27). Namely, based on the print length “10 mm” of the page P3, the maximum conveyance speed “80 mm/s” is specified (S81). In this case, it is required to change the maximum conveyance speed from “50 mm/s” to “80 mm/s” (S83). In the present example, the predeterminate conveyance distance X from the print position T2 to the page end position N2 of the page P3 is longer than the sum of a through-up amount of acceleration-deceleration printing V66 for accelerating the conveyance speed of the tape 8 from “50 mm/s” to “80 mm/s” and a through-down amount of through-down printing V67 for decelerating the conveyance speed of the tape 8 from “80 mm/s” to “0 mm/s” (S85: Yes). Therefore, the acceleration-deceleration printing V66 is performed, and the conveyance speed of the tape 8 is accelerated from “50 mm/s” to “80 mm/s” (S87, and S89: Yes). Further, the through-down printing V67 is performed (S13: Yes, S25: No, and S23), and the page end position N2 of the page P3 stops in the print position T2.

As described above, the printer 1 of the illustrative embodiment includes the conveyance motor 88, the receive buffer 44A, the print head 51, the cutter 57, and the CPU 41. The conveyance motor 88 is configured to convey the long tape 8 along a conveyance path. The receive buffer 44A is configured to receive and store print data for printing a page as a single unit. The print head 51 is configured to print a page on the tape 8 based on the print data stored in the receive buffer 44A, in the print position T2 on the conveyance path. The cutter 57 is configured to cut a predeterminate cut position of the tape 8 with the page printed thereon, in the cut position T1 downstream of the print position T2 in the conveyance direction of the tape 8. The CPU 41 is configured to perform the through-up printing process (S7), the constant-speed printing process (S11), and the through-down printing process (S23). In the through-up printing process, at least a part of a page is printed while the conveyance speed of the tape 8 is being accelerated at a particular acceleration. In the constant-speed printing process, at least a part of a page is printed while the conveyance speed is maintained at a maximum conveyance speed. In the through-down printing process, at least a part of a page is printed while the conveyance speed is being decelerated at a particular deceleration. Further, the CPU 41 sets the maximum conveyance speed in accordance with a print amount of the print data stored in the receive buffer 44A (S3).

Thereby, the maximum conveyance speed for the tape 8 is determined in accordance with the print amount (e.g., a print length and a received data amount) of the print data stored in the receive buffer 44A. According to the set maximum conveyance speed, the through-up amount in the through-up printing process and the through-down amount in the through-down printing process are determined. Thereby, it is possible to perform a printing operation while conveying the tape 8 at an appropriate conveyance speed in accordance with the print amount of the received print data. Thus, it is possible to expedite the printing operation as a whole. Further, even when the length of each of a plurality of pages in the conveyance direction is short, it is possible to appropriately implement continuous printing of the plurality of pages.

Further, the maximum conveyance speed is set in accordance with the print length of the page printed based on the print data stored in the receive buffer 44A (S3). Accordingly, it is possible to perform a printing operation while conveying the tape 8 at an appropriate conveyance speed in accordance with the print length of the page.

Further, the maximum conveyance speed is set in such a manner that the print length of the page is coincident with the sum of the through-up amount over which the tape 8 is conveyed while the conveyance speed is accelerated from zero to the maximum conveyance speed at a particular acceleration and the through-down amount over which the tape 8 is conveyed while the conveyance speed is decelerated from the maximum conveyance speed to zero at a particular deceleration (S3). Accordingly, the tape 8 is conveyed only over the print length via the through-up printing process and the through-down printing process. Therefore, it is possible to convey the tape 8 faster and stop the tape 8 in an appropriate position.

Further, while one of the through-up printing process and the constant-speed printing process is in execution, it is determined whether print data of a next page is stored in the receive buffer 44A (S25). When the print data of the next page is stored in the receive buffer 44A (S25: Yes), the nonstop printing process is performed (S19). In the nonstop printing process, by continuing the one in execution of the through-up printing process and the through-down printing process, printing of the next page is begun after printing of the current page is completed. Thereby, when the print data of the next page has been received during the execution of the through-up printing process or the constant-speed printing process, it is possible to continuously print the next page by the nonstop printing process without having to stop conveying the tape 8.

As shown in the aforementioned modification (see FIG. 18), the maximum conveyance speed may be set based on a data amount of print data stored in the receive buffer 44A (S3). Thereby, it is possible to perform a printing operation while conveying the tape 8 at an appropriate conveyance speed in accordance with the data amount of the received print data. Further, the maximum conveyance speed is set in such a manner that a conveyance distance of the tape 8 corresponding to the data amount of the print data is coincident with the sum of the through-up amount and the through-down amount (S3). Thereby, the tape 8 is conveyed only over the print length by the through-up printing process and the through-down printing process. Thus, it is possible to convey the tape 8 faster and stop the tape 8 in an appropriate position.

Further, in the aforementioned modification, it is determined whether new print data has been added into the receive buffer 44A while one of the through-up printing process and the constant-speed printing process is in execution (S25). When new print data has been added (S25: Yes), the nonstop printing process is performed to continue the one in execution of the through-up printing process and the constant-speed printing process in accordance with the data amount of the added print data (S19). Thereby, it is possible to extend an execution period of time for the nonstop printing process in accordance with the data amount of the print data received during the execution of the through-up printing process or the constant-speed printing process.

Further, in the aforementioned illustrative embodiment and modification, the acceleration-deceleration printing process (S27) is performed. Specifically, during the execution of the through-up printing process or the constant-speed printing process, the maximum conveyance speed is updated in accordance with a print amount of print data stored in the receive buffer 44A. The through-up printing process or the through-down printing process until the conveyance speed becomes the updated maximum conveyance speed. Thereby, even during the execution of the through-up printing process or the through-down printing process, it is possible to change the conveyance speed of the tape 8 to an appropriate conveyance speed in accordance with the print amount of the received print data.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

A part of the main process may be changed. For instance, the acceleration-deceleration process (S27) may not be performed. The main process is not limited to a process to perform a printing operation on the tape 8 or the tube 9. The main process may be a process to perform a printing operation on other media. At least a part of the main process may be performed by a device (e.g., the PC 2) different from the printer 1. The print data stored in the receive buffer 44A is not limited to print data transmitted by the PC 2. The print data stored in the receive buffer 44A may be print data received from an external device via a network, or print data directly input into the printer 1 by the user.

What is claimed is:

1. A printer comprising:

a conveyor configured to convey a print medium along a conveyance path in a conveyance direction;

a storage configured to receive and store print data of a page as a single unit;

a print head configured to print the page on the print medium based on the print data stored in the storage, as the print medium is conveyed on the conveyance path; and a controller configured to perform:

a through-up printing process to control the print head to print at least a part of the page while controlling the conveyor to accelerate a conveyance speed of the print medium from zero at a particular acceleration;

a constant-speed printing process to control the print head to print at least a part of the page while controlling the conveyor to maintain a maximum conveyance speed after the conveyance speed reaches the maximum conveyance speed via the through-up printing process;

a through-down printing process to control the print head to print at least a part of the page while controlling the conveyor to decelerate the conveyance speed at a particular deceleration after performing at least one of the through-up printing process and the constant-speed printing process; and a maximum speed setting process to set the maximum conveyance speed in accordance with a print amount of the print data stored in the storage.

2. The printer according to claim 1, wherein the controller is further configured to, in the maximum speed setting process, set the maximum conveyance speed based on a print length of the page to be printed based on the print data stored in the storage.

3. The printer according to claim 2, wherein the controller is further configured to, in the maximum speed setting process, set the maximum conveyance speed such that the print length of the page is equal to a sum of:

a distance over which the print medium is conveyed while the conveyance speed is accelerated from zero to the maximum conveyance speed at the particular acceleration; and a distance over which the print medium is conveyed while the conveyance speed is decelerated from the maximum conveyance speed to zero at the particular deceleration.

4. The printer according to claim 2, wherein the page is a first page;

wherein the controller is further configured to perform:

a determining process to determine whether print data of a second page is stored in the storage while one of the through-up printing process and the constant-speed printing process is in execution, wherein the second page is to be printed subsequently to the first page; and a nonstop printing process to, when determining in the determining process that the print data of the second page is stored in the storage while one of the through-up printing process and the constant-speed printing process is in execution, continue the one of the through-up printing process and the constant-speed printing process in execution and begin to print the second page continuously after printing of the first page is completed.

5. The printer according to claim 1, wherein the print head comprises a plurality of printing elements arranged in a direction perpendicular to the conveyance direction, and is further configured to perform line-by-line printing using the plurality of printing elements, wherein the print data comprises one or more pieces of data, each of which is a single piece of data for printing, by the print head, a single line as a part of the page, and wherein the controller is further configured to, in the maximum speed setting process, set the maximum conveyance speed based on a data amount of the print data stored in the storage, the data amount being a total number of the one or more pieces of data included in the print data stored in the storage.

6. The printer according to claim 5, wherein the controller is further configured to, in the maximum speed setting process, set the maximum conveyance speed such that a length of the print medium in the conveyance direction corresponding to the data amount of the print data is equal to a sum of:

a distance over which the print medium is conveyed while the conveyance speed is accelerated from zero to the maximum conveyance speed at the particular acceleration; and a distance over which the print medium is conveyed while the conveyance speed is decelerated from the maximum conveyance speed to zero at the particular deceleration.

7. The printer according to claim 5, wherein the controller is further configured to perform:

a determining process to determine whether new print data has been added into the storage while one of the through-up printing process and the constant-speed printing process is in execution; and a nonstop printing process to, when determining in the determining process that the new print data has been added into the storage while one of the through-up printing process and the constant-speed printing process is in execution, continue the one of the through-up printing process and the constant-speed printing process in execution in accordance with a data amount of the added new print data.

8. The printer according to claim 1, wherein the controller is further configured to perform an acceleration-deceleration printing process to:

while one of the through-up printing process and the constant-speed printing process is in execution, update the maximum conveyance speed in accordance with the print amount of the print data stored in the storage; and continue the one of the through-up printing process and the constant-speed printing process in execution until the conveyance speed becomes the updated maximum conveyance speed.

9. The printer according to claim 1, wherein the controller comprises:

a processor; and a memory storing processor-executable instructions configured to, when executed by the processor, cause the processor to perform the through-up printing process, the constant-speed printing process, the through-down printing process, and the maximum speed setting process.

10. A method adapted to be implemented on a processor coupled with a printer comprising:

a conveyor configured to convey a print medium along a conveyance path in a conveyance direction;

a storage configured to receive and store print data of a page as a single unit; and a print head configured to print the page on the print medium based on the print data stored in the storage, as the print medium is conveyed on the conveyance path, the method comprising:

a through-up printing process to control the print head to print at least a part of the page while controlling the conveyor to accelerate a conveyance speed of the print medium from zero at a particular acceleration;

a constant-speed printing process to control the print head to print at least a part of the page while controlling the conveyor to maintain a maximum conveyance speed after the conveyance speed reaches the maximum conveyance speed via the through-up printing process;

a through-down printing process to control the print head to print at least a part of the page while controlling the conveyor to decelerate the conveyance speed at a particular deceleration after performing at least one of the through-up printing process and the constant-speed printing process; and a maximum speed setting process to set the maximum conveyance speed in accordance with a print amount of the print data stored in the storage.

11. A non-transitory computer-readable medium storing computer-readable instructions that are executable by a processor coupled with a printer comprising:

a conveyor configured to convey a print medium along a conveyance path in a conveyance direction;

a storage configured to receive and store print data of a page as a single unit; and a print head configured to print the page on the print medium based on the print data stored in the storage, as the print medium is conveyed on the conveyance path, the instructions being configured to, when executed by the processor, cause the processor to perform:

a through-up printing process to control the print head to print at least a part of the page while controlling the conveyor to accelerate a conveyance speed of the print medium from zero at a particular acceleration;

a constant-speed printing process to control the print head to print at least a part of the page while controlling the conveyor to maintain a maximum conveyance speed after the conveyance speed reaches the maximum conveyance speed via the through-up printing process;

a through-down printing process to control the print head to print at least a part of the page while controlling the conveyor to decelerate the conveyance speed at a particular deceleration after performing at least one of the through-up printing process and the constant-speed printing process; and a maximum speed setting process to set the maximum conveyance speed in accordance with a print amount of the print data stored in the storage.

* * * * *